US009858875B2

(12) United States Patent
Tomikawa

(10) Patent No.: US 9,858,875 B2
(45) Date of Patent: *Jan. 2, 2018

(54) DRIVING METHOD FOR LIQUID CRYSTAL DEVICE, LIQUID CRYSTAL DEVICE, AND ELECTRONIC DEVICE

(71) Applicant: Seiko Epson Corporation, Tokyo (JP)

(72) Inventor: Naoki Tomikawa, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/202,421

(22) Filed: Jul. 5, 2016

(65) Prior Publication Data

US 2016/0314753 A1    Oct. 27, 2016

Related U.S. Application Data

(63) Continuation of application No. 14/306,133, filed on Jun. 16, 2014, now Pat. No. 9,412,319.

(30) Foreign Application Priority Data

Jun. 17, 2013 (JP) ................. 2013-126339

(51) Int. Cl.
G09G 3/36 (2006.01)
G02F 1/1343 (2006.01)
(Continued)

(52) U.S. Cl.
CPC ......... *G09G 3/3614* (2013.01); *G02F 1/1337* (2013.01); *G02F 1/1339* (2013.01);
(Continued)

(58) Field of Classification Search
CPC .. G09G 3/3614; G09G 3/3688; G09G 3/3677; G09G 3/3648; G02F 1/133345;
(Continued)

(56) References Cited

U.S. PATENT DOCUMENTS 3,708,717 A    1/1973  Fleming
8,081,153 B2   12/2011 Shirasaka et al.
(Continued)

FOREIGN PATENT DOCUMENTS

JP   2002-122840 A    4/2002
JP   2007-279172 A    10/2007
(Continued)

OTHER PUBLICATIONS

Non-Final Office Action received in U.S. Appl. No. 14/306,133, dated Dec. 30, 2015.
(Continued)

*Primary Examiner* — Patrick Edouard
*Assistant Examiner* — Joseph Fox
(74) *Attorney, Agent, or Firm* — ALG Intellectual Property, LLC

(57) ABSTRACT

A liquid crystal device includes a first and second substrate, a sealant, a liquid crystal layer, and a first and second electrode. The first substrate includes a display region in which a plurality of pixel electrodes are aligned in a matrix. The second substrate includes a common electrode. The sealant is disposed between the first and second substrate so as to surround the display region. The liquid crystal layer is interposed between the first substrate, the second substrate and the sealant. The first electrode is disposed between the display region and the sealant. The second electrode is disposed between the display region and the first pixel electrode. The first electrode is supplied a first signal. The second electrode is supplied a second signal. The pixel electrodes are supplied an image signal. A frequency of each of the first and second signals are lower than a frequency of the image signal.

9 Claims, 16 Drawing Sheets

(51) Int. Cl.
*G02F 1/1335* (2006.01)
*G02F 1/1337* (2006.01)
*G02F 1/1339* (2006.01)
*G02F 1/1362* (2006.01)
*G02F 1/1368* (2006.01)
*G02B 27/01* (2006.01)
*G02F 1/1333* (2006.01)

(52) U.S. Cl.
CPC ...... *G02F 1/1368* (2013.01); *G02F 1/133345* (2013.01); *G02F 1/133528* (2013.01); *G02F 1/134309* (2013.01); *G02F 1/134336* (2013.01); *G02F 1/136286* (2013.01); *G09G 3/3648* (2013.01); *G09G 3/3677* (2013.01); *G09G 3/3688* (2013.01); *G02B 27/01* (2013.01); *G02B 27/017* (2013.01); *G02F 2001/133302* (2013.01); *G02F 2001/133357* (2013.01); *G02F 2001/133388* (2013.01); *G02F 2001/133548* (2013.01); *G02F 2001/133742* (2013.01); *G02F 2001/133749* (2013.01); *G02F 2201/121* (2013.01); *G02F 2201/123* (2013.01); *G09G 2300/0413* (2013.01); *G09G 2300/0426* (2013.01); *G09G 2310/06* (2013.01); *G09G 2310/08* (2013.01)

(58) Field of Classification Search
CPC .............. G02F 1/1339; G02F 1/134336; G02F 1/133528; G02F 1/136286; G02F 1/1337; G02F 1/1368; G02F 2001/133742; G02F 1/134; G02F 1/309; G02F 2001/133388; G02B 27/017; G02B 27/01
See application file for complete search history.

(56) References Cited

U.S. PATENT DOCUMENTS

| | | |
|---|---|---|
| 2006/0007378 A1 | 1/2006 | Nakao |
| 2008/0055529 A1 | 3/2008 | Shirasaka |
| 2009/0072136 A1 | 3/2009 | Pringle |
| 2010/0218889 A1* | 9/2010 | Verschueren ......... G02F 1/1343 156/275.5 |
| 2012/0242914 A1 | 9/2012 | Hara et al. |
| 2012/0256082 A1 | 10/2012 | Masujima |
| 2012/0307176 A1 | 12/2012 | Tanaka |
| 2013/0021657 A1 | 1/2013 | Tomikawa et al. |
| 2013/0027446 A1 | 1/2013 | Nishida |
| 2013/0300961 A1 | 11/2013 | Tomikawa |
| 2013/0302921 A1 | 11/2013 | Tomikawa |

FOREIGN PATENT DOCUMENTS

| | | |
|---|---|---|
| JP | 2007-316119 A | 12/2007 |
| JP | 2008-058497 A | 3/2008 |
| JP | 2008-089938 A | 4/2008 |
| JP | 2008-292861 A | 12/2008 |
| JP | 2012-198395 A | 10/2012 |
| JP | 2012-247662 A | 12/2012 |
| JP | 2012-247663 A | 12/2012 |
| JP | 2013-025066 A | 2/2013 |
| JP | 2013-235128 A | 11/2013 |
| JP | 2013-235171 A | 11/2013 |

OTHER PUBLICATIONS

Notice of Allowance and Notice of Allowability received in U.S. Appl. No. 14/306,133, dated Apr. 5, 2016.

* cited by examiner

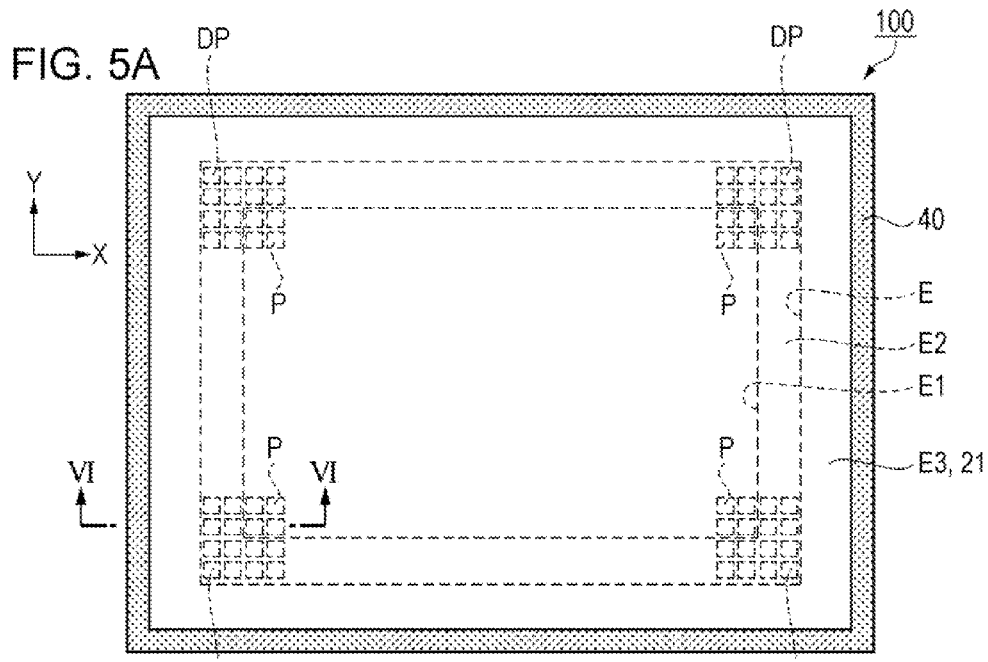
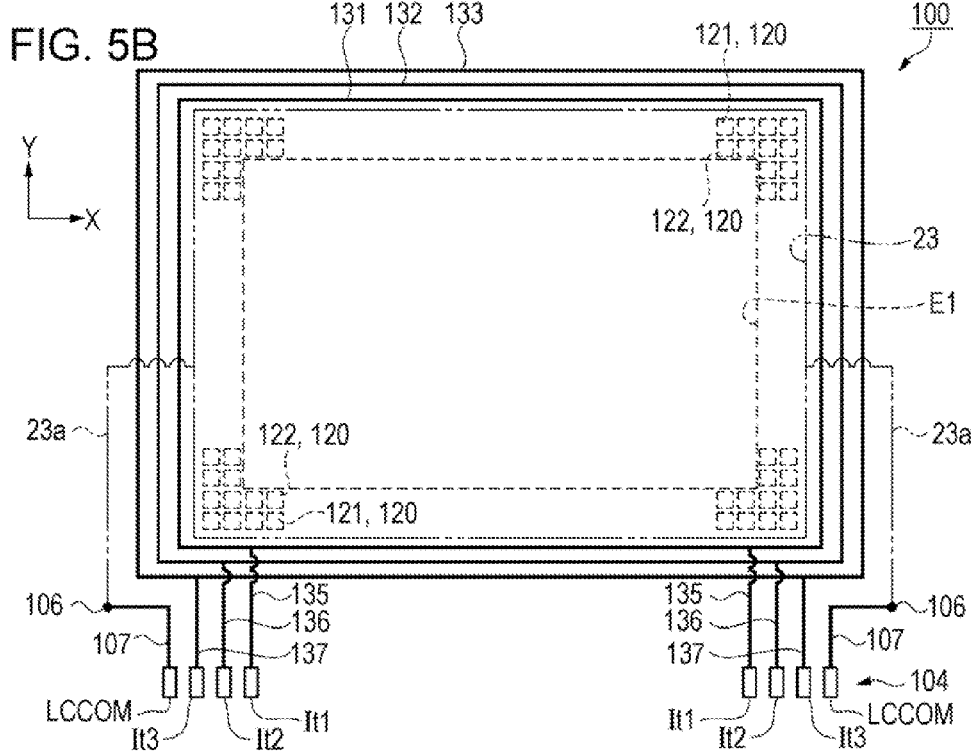

DRIVING METHOD FOR LIQUID CRYSTAL DEVICE, LIQUID CRYSTAL DEVICE, AND ELECTRONIC DEVICE The present application is a continuation of U.S. patent application Ser. No. 14/306,133 filed Jun. 16, 2014, which claims priority from Japanese Patent Application No. 2013-126339 filed Jun. 17, 2013, which hereby are expressly incorporated by reference herein.

BACKGROUND

1. Technical Field

The present invention relates to driving methods for liquid crystal devices, liquid crystal devices, and electronic devices that include such liquid crystal devices.

2. Related Art

A liquid crystal device includes a liquid crystal panel in which a liquid crystal layer is interposed between two substrates. When light is incident on such a liquid crystal device, a liquid crystal material, an orientation layer, and so on that configure the liquid crystal panel react photochemically with the incident light, and ionic impurities are sometimes produced by the reaction. It is furthermore known that ionic impurities diffuse into the liquid crystal layer from sealants, sealing members, and so on during the production of such a liquid crystal panel. In particular, the luminous density of the incident light is higher in a liquid crystal device such as an optical modulation unit (a light valve) that is used in a projection-type display apparatus (a projector) than in a direct-view liquid crystal device, and it is thus necessary to suppress the influence that ionic impurities have on the display.

As a technique for suppressing the influence of ionic impurities on a display, JP-A-2008-58497, for example, discloses a driving method for a liquid crystal display device in which peripheral electrodes configured of a plurality of adjacent electrodes are provided in a peripheral region surrounding a pixel region in at least one substrate in a pair of substrates between which a liquid crystal layer is interposed, and voltage values of driving voltages applied between adjacent electrodes in the peripheral electrodes vary.

According to the driving method for a liquid crystal display device disclosed in JP-A-2008-58497, a horizontal electrical field is produced between adjacent electrodes in the peripheral electrodes, which produces a force that causes ionic impurities to move in addition to a flow produced by minute amounts of sway in the liquid crystals; as a result, ionic impurities that move from the pixel region can be quickly moved outside of the pixel region, and display problems caused by the ionic impurities, such as burn-in, can be prevented.

However, according to the liquid crystal display device and the driving method thereof disclosed in the aforementioned JP-A-2008-58497, the direction of an electric flux line produced by applying an AC voltage between adjacent electrodes A and B in the peripheral electrodes include a direction from the electrode A, which is closer to the pixel region, toward the electrode B, as well as a direction from the electrode B, which is farther from the pixel region, toward the electrode A. Ionic impurities have a positive or a negative polarity, and as such it is possible to pull the ionic impurities using the electrical field produced between the adjacent electrodes A and B; however, it cannot be said that the effect of sweeping off the ionic impurities from the pixel region to the outside thereof is consistently sufficient. There has thus been a problem that the influence ionic impurities contained in the liquid crystal layer have on the display cannot necessarily be sufficiently suppressed.

SUMMARY

Having been conceived in order to solve at least part of the aforementioned problems, the invention is to provide driving methods for liquid crystal devices, liquid crystal devices, and electronic devices that can be implemented as the following aspects or application examples.

First Application Example

A liquid crystal device driving method according to an aspect of the invention is a driving method for a liquid crystal device including a first substrate and a second substrate that are disposed opposing each other and are laminated to each other using a sealant, a liquid crystal layer interposed between the first substrate and the second substrate, a pixel electrode provided in a display region of the first substrate, an opposing electrode provided in the first substrate or the second substrate so as to oppose the pixel electrode, and a first electrode that, when viewed from above, is provided between the display region and the sealant and to which a first potential is supplied, a second electrode that, when viewed from above, is provided between the first electrode and the sealant and to which a second potential is supplied, and a third electrode that, when viewed from above, is provided between the second electrode and the sealant and to which a third potential is supplied, the first electrode, the second electrode, and the third electrode being provided in the first substrate or the second substrate. The driving method comprises applying AC signals having the same frequency to the first electrode, the second electrode, and the third electrode, respectively, so that the second potential shifts from a positive-polarity or a reference potential to a negative-polarity after the first potential has shifted from the positive-polarity or the reference potential to the negative-polarity but before the first potential shifts to the reference potential or the positive-polarity, the third potential shifts from the positive-polarity or the reference potential to the negative-polarity after the second potential has shifted to the negative-polarity but before the second potential shifts to the reference potential or the positive-polarity, the second potential shifts from the negative-polarity or the reference potential to the positive-polarity after the first potential has shifted from the negative-polarity or the reference potential to the positive-polarity but before the first potential shifts to the reference potential or the negative-polarity, and the third potential shifts from the negative-polarity or the reference potential to the positive-polarity after the second potential has shifted from the negative-polarity or the reference potential to the positive-polarity but before the second potential shifts to the reference potential or the negative-polarity.

According to the liquid crystal device driving method according to this aspect of the invention, AC signals whose phases are shifted are applied to the first electrode, the second electrode, and the third electrode, in that order, in an amount of time corresponding to a single cycle in which the first potential shifts from the reference potential, to the positive-polarity, and to the negative-polarity. Accordingly, the direction of an electrical field (electric flux line) produced between the electrodes changes from the first electrode, which is closest to the display region, toward the second electrode, and then from the second electrode toward the third electrode, as time passes. Due to the electrical field direction shifting, ionic impurities are first pulled to the first electrode, and are then pulled to the second electrode and the third electrode. In other words, a liquid crystal device driving method capable of effectively sweeping ionic impurities within the liquid crystal layer away from the display region can be provided.

It is preferable that, in the liquid crystal device driving method in the above example, a frequency f (Hz) of the AC signals fulfill the following formula:

$$f \leq 2\mu V_E/np^2$$

Here, μ represents a degree of movement (m²/V·s) of ionic impurities in the liquid crystal layer, $V_E$ represents an effective voltage (V) of the AC signals, n represents a number of electrodes to which the AC signals are applied, and p represents a pitch (m) at which the electrodes to which the AC signals are applied are disposed.

A movement velocity of the ionic impurities that move between the electrodes to which the AC signals have been applied, or in other words, an amount of time required for the movement, depends on a degree of movement of the ionic impurities and an essential potential difference between the electrodes, and is in an inverse proportion to the distance between the electrodes. Accordingly, it is preferable to match the manner in which the electrical field is produced between the electrodes to the movement velocity of the ionic impurities.

According to this method, the frequency f (Hz) of the AC signals is the same or lower than the velocity (amount of time) at which the ionic impurities move a distance corresponding to the pitch at which the electrodes are disposed, and thus the ionic impurities within the liquid crystal layer can be swept outside of the display region with certainty.

It is preferable that, in the liquid crystal device driving method in the above example, the AC signals applied to the first electrode, the second electrode, and the third electrode, respectively, have the same waveform.

The "same waveform" refers to waveforms whose phases are different but whose waveforms are substantially the same.

According to this method, it is not necessary to generate AC signals having different waveforms, and thus the configuration of a driving circuit can be simplified.

It is preferable that, in the liquid crystal device driving method in the above example, the AC signals have a potential of three or more values.

According to this method, the potentials applied to the first electrode, the second electrode, and the third electrode, respectively, have three or more values, and thus the electrical field can be caused to move between the electrodes smoothly.

It is preferable that, in the liquid crystal device driving method in the above example, the AC signals be square waves.

According to this method, an electrical field whose intensity is stable can be produced between adjacent electrodes among the first electrode, the second electrode, and the third electrode, and thus the ionic impurities can be more effectively swept away. Furthermore, it is easier to generate the AC signals than when using, for example, an analog signal such as a sine wave.

Second Application Example

A liquid crystal device according to another aspect of the invention includes a first substrate and a second substrate that are disposed opposing each other and are laminated to each other using a sealant, a liquid crystal layer interposed between the first substrate and the second substrate, a pixel electrode provided in a display region of the first substrate, an opposing electrode provided in the first substrate or the second substrate so as to oppose the pixel electrode, and a first electrode that, when viewed from above, is provided between the display region and the sealant and to which a first potential is supplied, a second electrode that, when viewed from above, is provided between the first electrode and the sealant and to which a second potential is supplied, and a third electrode that, when viewed from above, is provided between the second electrode and the sealant and to which a third potential is supplied, the first electrode, the second electrode, and the third electrode being provided in the first substrate or the second substrate. Here, AC signals having the same frequency are applied to the first electrode, the second electrode, and the third electrode, respectively, so that the second potential shifts from a positive-polarity or a reference potential to a negative-polarity after the first potential has shifted from the positive-polarity or the reference potential to the negative-polarity but before the first potential shifts to the reference potential or the positive-polarity, the third potential shifts from the positive-polarity or the reference potential to the negative-polarity after the second potential has shifted to the negative-polarity but before the second potential shifts to the reference potential or the positive-polarity, the second potential shifts from the negative-polarity or the reference potential to the positive-polarity after the first potential has shifted from the negative-polarity or the reference potential to the positive-polarity but before the first potential shifts to the reference potential or the negative-polarity, and the third potential shifts from the negative-polarity or the reference potential to the positive-polarity after the second potential has shifted from the negative-polarity or the reference potential to the positive-polarity but before the second potential shifts to the reference potential or the negative-polarity.

According to the liquid crystal device according to this aspect of the invention, AC signals whose phases are shifted are applied to the first electrode, the second electrode, and the third electrode, in that order, in an amount of time corresponding to a single cycle in which the first potential shifts from the reference potential, to the positive-polarity, and to the negative-polarity. Accordingly, the direction of an electrical field (electric flux line) produced between the electrodes moves from the first electrode, which is closest to the display region, toward the second electrode, and then from the second electrode toward the third electrode, as time passes. Due to the electrical field direction shifting, ionic impurities are first pulled to the first electrode, and are then pulled to the second electrode and the third electrode. In other words, a liquid crystal device capable of effectively sweeping ionic impurities within the liquid crystal layer away from the display region can be provided.

It is preferable that the liquid crystal device in the above example further include a delay circuit into which is inputted a first AC signal serving as the AC signal and from which are outputted a second AC signal whose phase is shifted relative to the phase of the first AC signal and a third AC signal whose phase is shifted relative to the phases of the first AC signal and the second AC signal.

According to this configuration, it is only necessary to input the first AC signal into the delay circuit rather than inputting all of the first AC signal, the second AC signal, and the third AC signal whose phases are different from each other from the exterior, which prevents the configuration of an external driving circuit from becoming complicated.

It is preferable that, in the liquid crystal device in the above example, the first electrode, the second electrode, and the third electrode be provided in the first substrate so as to surround the display region.

According to this configuration, the ionic impurities can be swept away from the display region to the outside regardless of the localization tendencies of the ionic impurities in the display region.

It is preferable that, in the liquid crystal device in the above example, the display region include an electricity parting portion having a plurality of dummy pixel electrodes provided so as to surround a plurality of the pixel electrodes, and that a gap between the electricity parting portion and the first electrode be greater than a gap between the first electrode and the second electrode.

According to this configuration, the influence of a horizontal electrical field produced between the first electrode and the electricity parting portion for sweeping away the ionic impurities can be reduced.

It is preferable that, in the liquid crystal device in the above example, the opposing electrode be provided in the second substrate, and when viewed from above, an outer edge of the opposing electrode be located between the first electrode and the display region.

According to this configuration, the opposing electrode does not oppose the first electrode, the second electrode, and the third electrode with the liquid crystal layer interposed therebetween, and thus it is difficult for an electrical field to be produced between the opposing electrode and the first electrode, the second electrode, and the third electrode, respectively. In other words, the ionic impurities can be effectively swept from the display region to the outside by the electrical fields produced between the adjacent electrodes among the first electrode, the second electrode, and the third electrode.

It is preferable that, in the liquid crystal device in the above example, the first electrode, the second electrode, and the third electrode be provided in the first substrate, and the opposing electrode be provided in the second substrate in a region that, when viewed from above, contains the display region and extends to a region that opposes the first electrode, the second electrode, and the third electrode, with the reference potential being applied to the opposing electrode.

According to this configuration, it is not necessary to perform patterning on the opposing electrode so that the opposing electrode does not oppose the first electrode, the second electrode, and the third electrode, which makes it possible to simplify configurations such as interconnects and the like connected to the opposing electrode.

It is preferable that, in the liquid crystal device in the above example, the pixel electrode, the opposing electrode, the first electrode, the second electrode, and the third electrode be each covered by an inorganic orientation layer.

According to this configuration, a liquid crystal device in which the influence of ionic impurities on the display is suppressed can be provided even if an inorganic orientation layer, to which ionic impurities adhere with ease, is employed.

It is preferable that, in the liquid crystal device in the above example, the pixel electrode be formed of a conductive film having a light-reflecting property, the opposing electrode be formed of a conductive film having a light-transmissive property, and an inorganic insulating film be formed between the pixel electrode and the inorganic orientation layer.

According to this configuration, unlike a case where DC signals are applied to the first electrode, the second electrode, and the third electrode, respectively, the potential of the AC signals will not drop even if an inorganic insulating film is formed between the pixel electrode and the inorganic orientation layer, and thus a reflective liquid crystal device capable of sweeping away ionic impurities outside of the display region can be provided. In addition, because the inorganic insulating film is formed between the pixel electrode and the inorganic orientation layer, variations in the reference potential caused by work functions differing between the pixel electrode and the opposing electrode can be suppressed. In other words, a reflective liquid crystal device having superior display quality can be provided.

Third Application Example

An electronic device according to another aspect of the invention includes a liquid crystal device driven using the driving method for a liquid crystal device according to the above aspects.

Fourth Application Example

An electronic device according to another aspect of the invention includes the liquid crystal device according to the above aspects.

According to these aspects of the invention, an electronic device that ameliorates display problems caused by ionic impurities and has superior display quality can be provided.

BRIEF DESCRIPTION OF THE DRAWINGS

The invention will be described with reference to the accompanying drawings, wherein like numbers reference like elements.

FIG. 5A is a plan view illustrating an overview of an arrangement of active display pixels and dummy pixels, and FIG. 5B is a wiring diagram illustrating an electricity parting portion and an ion trapping mechanism.

DESCRIPTION OF EXEMPLARY EMBODIMENTS

Hereinafter, specific embodiments of the invention will be described based on the drawings. Note that the drawings used here illustrate the areas being described in an enlarged or reduced manner so that those areas can be recognized properly.

Note also that in the following embodiments, the phrase "on a substrate", for example, can refer to a constituent element being disposed directly on top of the substrate, a constituent element being disposed on top of the substrate with another constituent element provided therebetween, or part of the constituent element being disposed directly on top of the substrate while another part is disposed on top of the substrate with another constituent element provided therebetween.

First Embodiment

This embodiment describes an active matrix-type liquid crystal device that includes thin-film transistors (TFTs) as pixel switching elements as an example. This liquid crystal device can be used favorably as an optical modulation unit (a liquid crystal light valve) in a projection-type display apparatus (a liquid crystal projector), for example, which will be described later.

Liquid Crystal Device

Figure 1A:
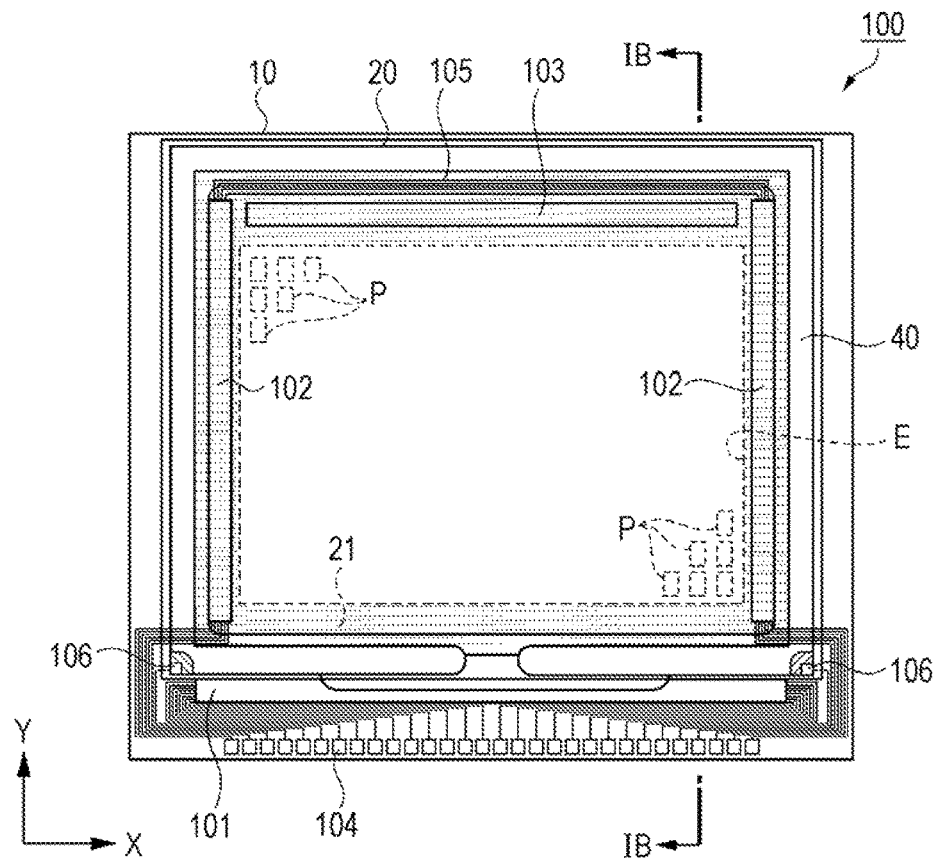
FIG. 1A is a plan view illustrating the overall configuration of a liquid crystal device according to a first embodiment.
Figure 1B:
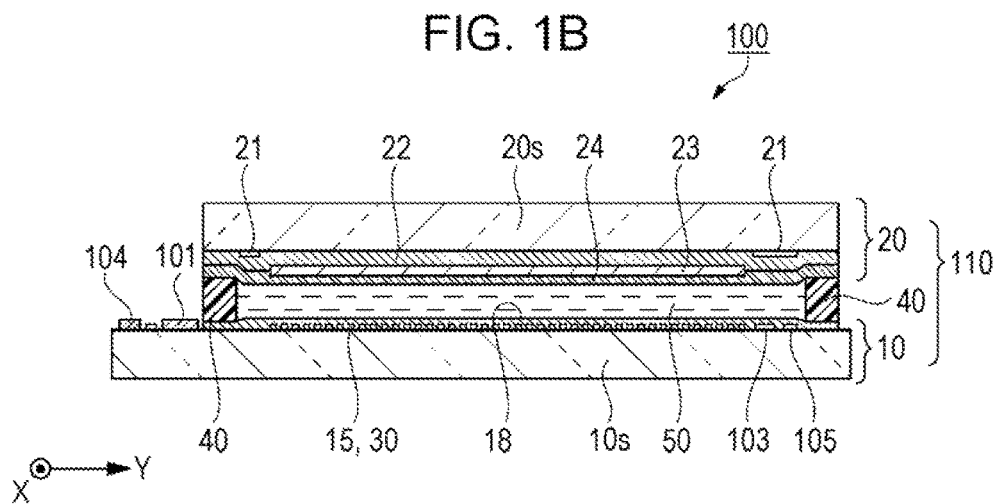
FIG. 1B is an overall cross-sectional view taken along a IB-IB line indicated in FIG. 1A.
Figure 2:
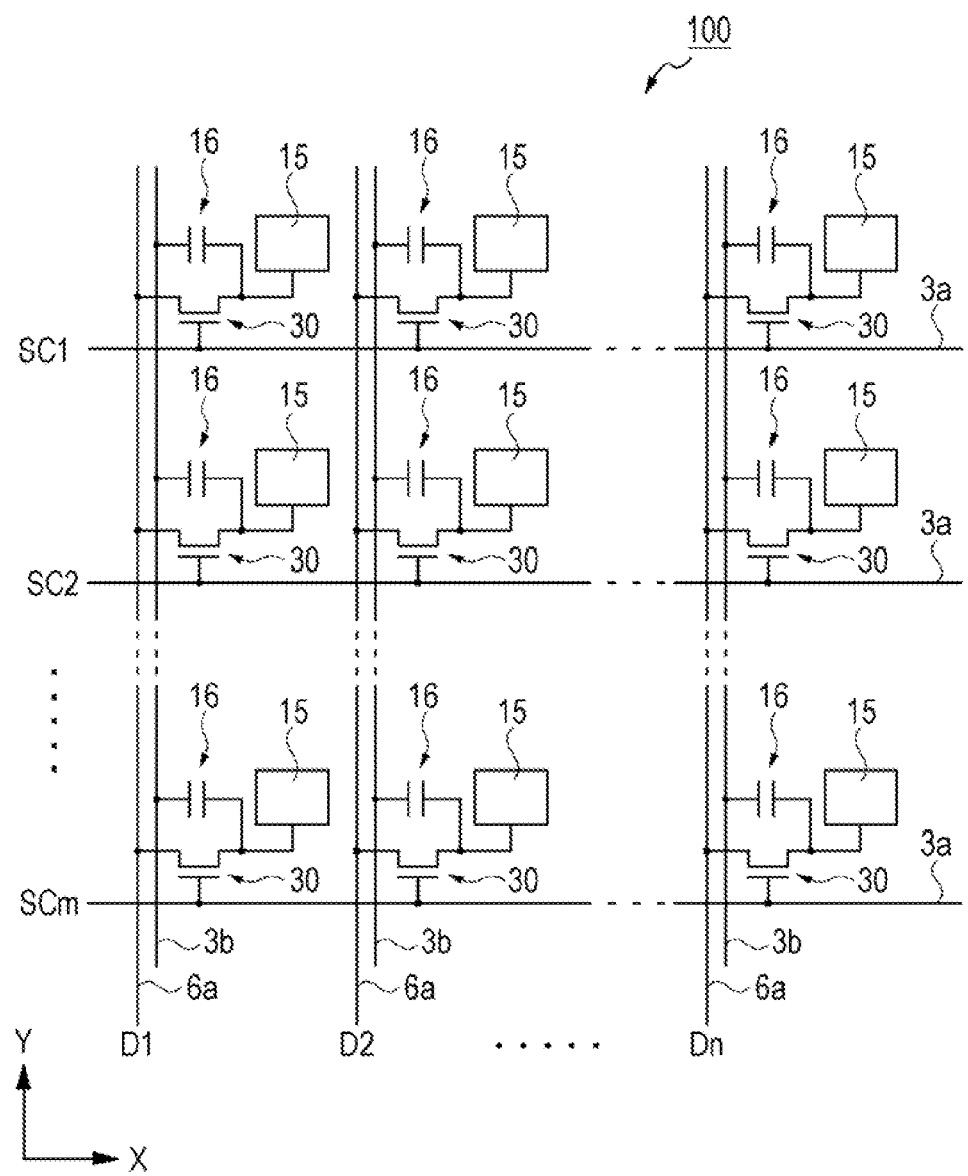
FIG. 2 is an equivalent circuit diagram illustrating the electrical configuration of the liquid crystal device according to the first embodiment.

First, a liquid crystal device according to this embodiment will be described with reference to FIGS. 1A to 2. FIG. 1A is a general plan view illustrating the configuration of the liquid crystal device according to the first embodiment, and FIG. 1B is an overall cross-sectional view taken along a IB-IB line indicated in FIG. 1A. FIG. 2 is an equivalent circuit diagram illustrating the electrical configuration of the liquid crystal device according to the first embodiment.

As shown in FIGS. 1A and 1B, a liquid crystal device 100 according to this embodiment includes an element substrate 10 and an opposing substrate 20 that are disposed facing each other, and a liquid crystal layer 50 interposed between the stated two substrates. A substrate 10s of the element substrate 10 and a substrate 20s of the opposing substrate 20 both use a transparent substrate, such as a silica substrate, a glass substrate, or the like. The element substrate 10 corresponds to a first substrate according to the invention, and the opposing substrate 20 corresponds to a second substrate according to the invention.

The element substrate 10 is larger than the opposing substrate 20, and the substrates are affixed to each other using a sealant 40 disposed along an outer edge of the opposing substrate 20 so that a gap is present between the two substrates; the liquid crystal layer 50 is configured by filling the gap with liquid crystals having positive or negative dielectric anisotropy. An adhesive such as a thermosetting or ultraviolet light-curable epoxy resin is employed as the sealant 40. Spacers (not shown) for maintaining the aforementioned gap between the two substrates are intermixed with the sealant 40.

A display region E including a plurality of pixels P arranged in a matrix is provided on an inner side of the sealant 40. A parting portion 21 that surrounds the display region E is provided between the sealant 40 and the display region E. The parting portion 21 is configured of, for example, a metal or a metal oxidant that blocks light. Note that in addition to the plurality of pixels P that actively display, the display region E may also include dummy pixels disposed so as to surround the plurality of pixels P. Furthermore, although not shown in FIGS. 1A and 1B, a light-blocking portion that separates the plurality of pixels P from each other in the display region E when viewed from above (a "black matrix" or "BM") is provided in the opposing substrate 20.

A terminal unit in which a plurality of external connection terminals 104 are arranged is provided in the element substrate 10. A data line driving circuit 101 is provided between a first side and the sealant 40 that follow the terminal unit. An examination circuit 103 is provided between the sealant 40 and the display region E, following a second side that opposes the first side. Furthermore, scanning line driving circuits 102 are provided between the sealant 40 and the display region E, following third and fourth sides, respectively, that oppose each other and are orthogonal to the first side. A plurality of wires 105 that connect the two scanning line driving circuits 102 are provided between the sealant 40 and the examination circuit 103 on the second side.

The wires that connect the data line driving circuit 101 and the scanning line driving circuits 102 are connected to the plurality of external connection terminals 104 arranged along the first side. The following descriptions will assume that a direction following the first side is an X direction, and a direction following the third side is a Y direction. Note that the location of the examination circuit 103 is not limited to that described above, and the examination circuit 103 may be provided along an inner side of the sealant 40, between the data line driving circuit 101 and the display region E.

As shown in FIG. 1B, a light-transmissive pixel electrode 15 and a thin-film transistor ("TFT", hereinafter) 30 serving as a switching element are provided for each of the pixels P, along with signal lines, in the surface of the element substrate 10 facing the liquid crystal layer 50; an orientation layer 18 is formed so as to cover these elements. A light-blocking structure that prevents light from entering a semiconductor layer of the TFT 30 and destabilizing the switching operations of the TFT 30 is employed. The element substrate 10 includes the substrate 10s as well as the pixel electrodes 15, the TFTs 30, the signal lines, and the orientation layer 18 formed upon the substrate 10s.

The opposing substrate 20 disposed facing the element substrate 10 includes the substrate 20s, the parting portion 21 that is formed upon the substrate 20s, a planarizing layer 22 deposed so as to cover the parting portion 21, a common electrode 23 provided across the display region E and covering the planarizing layer 22, and an orientation layer 24 that covers the common electrode 23. The common electrode 23 corresponds to an opposing electrode according to the invention.

As shown in FIG. 1A, the parting portion 21 is provided so as to surround the display region E, in a location that overlaps with the scanning line driving circuits 102 and the examination circuit 103 when viewed from above. As a result, the parting portion 21 blocks light from being incident on the stated circuits from the opposing substrate 20 and prevents the stated circuits from operating erroneously due to such light. The parting portion 21 furthermore ensures high contrast in the display of the display region E by blocking unnecessary stray light from entering the display region E.

The planarizing layer 22 is configured of an inorganic material such as silicon oxide, is light-transmissive, and is provided so as to cover the parting portion 21. A method that employs plasma CVD can be given as an example of a method for forming the planarizing layer 22.

The common electrode 23 is configured of a transparent conductive film such as ITO (indium tin oxide), covers the planarizing layer 22, and is electrically connected to upper and lower conductive portions 106 provided at each of the lower corners of the opposing substrate 20, as shown in FIG. 1A. The upper and lower conductive portions 106 are electrically connected to interconnects on the element substrate 10 side.

The orientation layer 18 that covers the pixel electrodes 15 and the orientation layer 24 that covers the common electrode 23 are selected based on the optical design of the liquid crystal device 100. Examples of the orientation layers 18 and 24 include an organic orientation layer produced by forming a film from an organic material such as a polyimide and rubbing the surface thereof to achieve an approximately horizontal orientation process on liquid crystal molecules having positive dielectric anisotropy, and an inorganic orientation layer produced by forming a film from an inorganic material such as SiOx (silicon oxide) through chemical vapor deposition and achieving approximately vertical orientation for liquid crystal molecules having negative dielectric anisotropy.

The liquid crystal device 100 is transmissive, and employs an optical design having a "normally-white mode", in which the transmissibility of the pixels P is maximum when no voltage is being applied thereto, a "normally-black mode", in which the transmissibility of the pixels P is minimum when no voltage is being applied thereto, or the like. Furthermore, depending on the optical design, polarizing elements are disposed on a light-entry side and a light-exit side of a liquid crystal panel 110 that includes the element substrate 10 and the opposing substrate 20.

Hereinafter, this embodiment will describe an example in which the aforementioned inorganic orientation layer is used for the orientation layers 18 and 24, liquid crystals having negative dielectric anisotropy are used, and a normally-black mode optical design is applied.

Next, the electrical configuration of the liquid crystal device 100 will be described with reference to FIG. 2. The liquid crystal device 100 includes, in at least the display region E, a plurality of scanning lines 3a and a plurality of data lines 6a, serving as signal lines that are insulated from each other and that are orthogonal to each other, as well as capacitance lines 3b disposed parallel to the data lines 6a. The scanning lines 3a extend in the X direction, whereas the data lines 6a extend in the Y direction.

The pixel electrodes 15, the TFTs 30, and storage capacitances 16 are provided at the scanning lines 3a, the data lines 6a, and the capacitance lines 3b and in each region defined by the signal lines, and configure the pixel circuits of the corresponding pixels P.

Each scanning line 3a is electrically connected to the gate of a corresponding TFT 30, and each data line 6a is electrically connected to the source of the corresponding TFT 30. Each pixel electrode 15 is electrically connected to the drain of the corresponding TFT 30.

The data lines 6a are connected to the data line driving circuit 101 (see FIG. 1A), and image signals D1, D2, . . . , Dn supplied from the data line driving circuit 101 are in turn supplied to the pixels P. The scanning lines 3a are connected to the scanning line driving circuits 102 (see FIG. 1A), and scanning signals SC1, SC2, . . . , SCm supplied from the scanning line driving circuits 102 are in turn supplied to the pixels P.

The image signals D1 to Dn supplied to the data lines 6a from the data line driving circuit 101 may be supplied line-sequentially in that order, or may be supplied in groups of a plurality of the data lines 6a that are adjacent to each other. The scanning line driving circuits 102 supply the scanning signals SC1 to SCm to the scanning lines 3a in pulses at a predetermined timing, in a line-sequential manner.

The liquid crystal device 100 is configured so that the TFTs 30 serving as switching elements turn on for a set period when the scanning signals SC1 to SCm are inputted thereto and the image signals D1 to Dn supplied from the data lines 6a are written into the pixel electrodes 15 at a predetermined timing as a result. The image signals D1 to Dn that have been written to the liquid crystal layer 50 at predetermined levels via the pixel electrodes 15 are then held for a set period between the pixel electrodes 15 and the common electrode 23 disposed facing the pixel electrodes 15 on another side of the liquid crystal layer 50. The frequency of the image signals D1 to Dn is 60 Hz, for example.

To prevent the held image signals D1 to Dn from leaking, the storage capacitances 16 are connected in series to liquid crystal capacitors formed between the pixel electrodes 15 and the common electrode 23. Each storage capacitance 16 is provided between the drain of the corresponding TFT 30 and the capacitance line 3b.

Although FIG. 1A depicts a configuration in which the data lines 6a are connected to the examination circuit 103 and operational defects and the like can be confirmed in the liquid crystal device 100 by detecting the image signals during the process of manufacturing the liquid crystal device 100, the examination circuit 103 is not shown in the equivalent circuit illustrated in FIG. 2.

In this embodiment, the peripheral circuits that control the driving of the pixel circuits include the data line driving circuit 101, the scanning line driving circuits 102, and the examination circuit 103. The peripheral circuits may also include a sampling circuit that samples the image signals and supplies samples to the data lines 6a and a precharge circuit that supplies precharge signals at predetermined voltage levels to the data lines 6a prior to the image signals.

Figure 3:
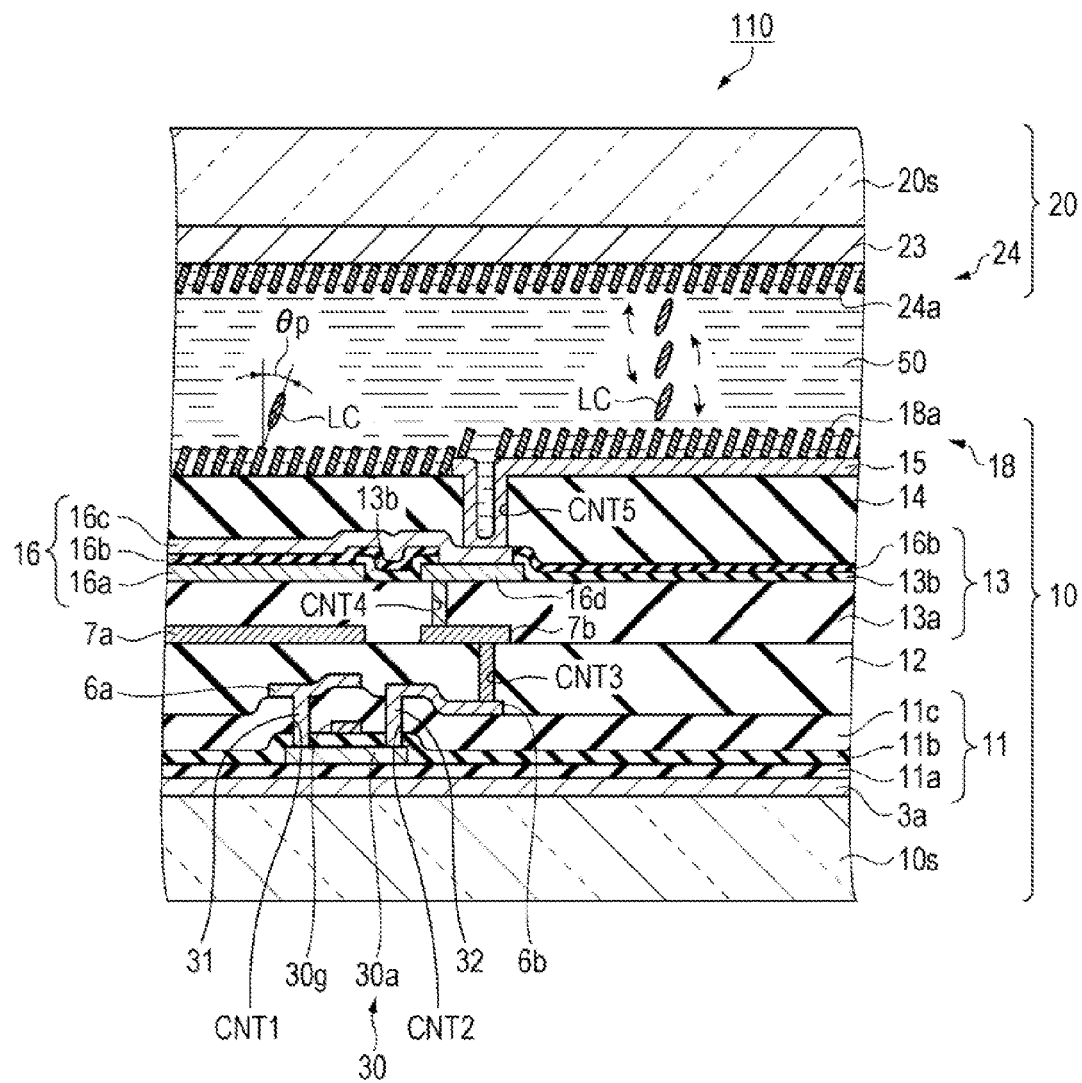
FIG. 3 is a cross-sectional view illustrating the overall structure of a pixel in the liquid crystal device according to the first embodiment.

Next, the structure of the pixels P in the liquid crystal device 100 (the liquid crystal panel 110) according to this embodiment will be described. FIG. 3 is a cross-sectional view illustrating the overall structure of a pixel in the liquid crystal device according to the first embodiment.

As shown in FIG. 3, first, the scanning line 3a is formed on the substrate 10s of the element substrate 10. The scanning line 3a is configured of a metal element including at least one of Al (aluminum), Ti (titanium), Cr (chromium), W (tungsten), Ta (tantalum), Mo (molybdenum), and the like, an alloy, a metal silicide, a polysilicide, a nitride, or a layered combination thereof, and has light-blocking properties.

A first insulating film (a base insulating film) 11a configured of silicon oxide, for example, is formed so as to cover the scanning line 3a, and a semiconductor layer 30a is formed in an island shape on the first insulating film 11a. The semiconductor layer 30a is configured of a polycrystal silicon film, for example, into which ion impurities are injected, forming an LDD (lightly-doped drain) structure including a first source-drain region, a junction region, a channel region, a junction region, and a second source-drain region.

A second insulating film (gate insulator) 11b is formed so as to cover the semiconductor layer 30a. A gate electrode 30g is formed in a position that faces the channel region, with the second insulating film 11b located therebetween.

A third insulating film 11c is formed so as to cover the gate electrode 30g and the second insulating film 11b, and two contact holes CNT1 and CNT2 that pass through the second insulating film 11b and the third insulating film 11c are formed in positions corresponding to the respective end areas of the semiconductor layer 30a.

A source electrode 31 connected to the first source-drain region via the contact hole CNT1 is formed along with the data line 6a by forming a conductive film of a light-blocking conductive material such as Al (aluminum), an alloy thereof, or the like so as to coat the two contact holes CNT1 and CNT2 and cover the third insulating film 11c and patterning the conductive film. A drain electrode 32 (a first relay electrode 6b) connected to the second source-drain region via the contact hole CNT2 is formed at the same time.

Next, a first interlayer insulating film 12 is formed so as to cover the data line 6a as well as the first relay electrode 6b and the third insulating film 11c. The first interlayer insulating film 12 is configured of silicon oxide, nitride, or the like, for example. A planarizing process for planarizing non-planarities produced in the surface of the first interlayer insulating film 12 when the region in which the TFT 30 is provided is covered is carried out thereon. Chemical mechanical polishing (CMP), spin coating, and so on can be given as examples of techniques used for the planarizing process.

A contact hole CNT3 that passes through the first interlayer insulating film 12 is formed in a position corresponding to the first relay electrode 6b. An interconnect 7a and a second relay electrode 7b electrically connected to the first relay electrode 6b via the contact hole CNT3 are formed by forming a conductive film of a light-blocking metal such as Al (aluminum), an alloy thereof, or the like so as to coat the contact hole CNT3 and cover the first interlayer insulating film 12 and patterning the conductive film.

The interconnect 7a is formed so as to overlap with the semiconductor layer 30a of the TFT 30, the data line 6a, and so on when viewed from above; a fixed potential is applied to the interconnect 7a, and thus the interconnect 7a functions as a shield layer.

A second interlayer insulating film 13a is formed so as to cover the interconnect 7a and the second relay electrode 7b. The second interlayer insulating film 13a can also be formed of silicon oxide, nitride, or the like, or an oxynitride, and a planarizing process such as CMP is carried out thereon.

A contact hole CNT4 is formed in the second interlayer insulating film 13a in a position corresponding to the second relay electrode 7b. A first capacitance electrode 16a and a third relay electrode 16d are formed by forming a conductive film of a light-blocking metal such as Al (aluminum), an alloy thereof, or the like so as to coat the contact hole CNT4 and cover the second interlayer insulating film 13a and patterning the conductive film.

An insulating film 13b is formed through patterning so as to cover an outer edge of the first capacitance electrode 16a in an area thereof that faces a second capacitance electrode 16c on another side of a dielectric layer 16b, which are formed later. In addition, the insulating film 13b is formed through patterning so as to cover outer edges of the third relay electrode 16d in areas aside from an area that overlaps with a contact hole CNT5.

The dielectric layer 16b is formed covering the insulating film 13b and the first capacitance electrode 16a. A silicon nitride film, a single-layer film such as hafnium oxide ($HfO_2$), alumina ($Al_2O_3$), tantalum oxide ($Ta_2O_5$), or the like, or a multilayer film in which at least two types of such single-layer films are stacked may be used as the dielectric layer 16b. The dielectric layer 16b is removed through etching or the like in an area thereof that overlaps with the third relay electrode 16d when viewed from above. The second capacitance electrode 16c is formed facing the first capacitance electrode 16a and connected to the third relay electrode 16d by forming a conductive film of TiN (titanium nitride), for example, so as to cover the dielectric layer 16b and patterning the conductive film. The storage capacitance 16 is configured of the dielectric layer 16b, the first capacitance electrode 16a and the second capacitance electrode 16c that are disposed facing each other with the dielectric layer 16b therebetween.

Next, a third interlayer insulating film 14 is formed so as to cover the second capacitance electrode 16c and the dielectric layer 16b. The third interlayer insulating film 14 can also be formed of silicon oxide, nitride, or the like, and a planarizing process such as CMP is carried out thereon. The contact hole CNT5 is formed passing through the third interlayer insulating film 14 so that the second capacitance electrode 16c makes contact with the third relay electrode 16d.

A transparent conductive film (electrode film) configured of ITO, for example, is deposed so as to coat the contact hole CNT5 and cover the third interlayer insulating film 14. The pixel electrode 15 that is electrically connected to the second capacitance electrode 16c and the third relay electrode 16d via the contact hole CNT5 is formed by patterning this transparent conductive film (electrode film).

The second capacitance electrode 16c is electrically connected to the drain electrode 32 of the TFT 30 via the third relay electrode 16d, the contact hole CNT4, the second relay electrode 7b, the contact hole CNT3, and the first relay electrode 6b, and is electrically connected to the pixel electrode 15 via the contact hole CNT5.

The first capacitance electrode 16a is formed so as to span across a plurality of the pixels P, and functions as the capacitance line 3b in the equivalent circuit (see FIG. 2). A fixed potential is applied to the first capacitance electrode 16a. Through this, a potential applied to the pixel electrode 15 via the drain electrode 32 of the TFT 30 can be held between the first capacitance electrode 16a and the second capacitance electrode 16c.

A plurality of wires are formed on the substrate 10s of the element substrate 10, and a wire layer is indicated by the reference numerals of insulating films, interlayer insulating films, and so on that provide insulation between the wires. In other words, the first insulating film 11a, the second insulating film 11b, and the third insulating film 11c are collectively referred to as a wire layer 11. The representative wire in the wire layer 11 is the scanning line 3a. The representative wire in a wire layer 12 is the data line 6a. The second interlayer insulating film 13a, the insulating film 13b, and the dielectric layer 16b are collectively referred to as a wire layer 13, and the representative wire in the wire layer 13 is the interconnect 7a. Likewise, the representative wire in a wire layer 14 is the first capacitance electrode 16a (the capacitance line 3b).

The orientation layer 18 is formed so as to cover the pixel electrode 15, and the orientation layer 24 is formed so as to cover the common electrode 23 in the opposing substrate 20 disposed facing the element substrate 10 on another side of the liquid crystal layer 50. As described earlier, the orientation layers 18 and 24 are inorganic orientation layers, and are collections of columns 18a and 24a, respectively, in which an inorganic material such as silicon oxide is deposited in column form at an angle from a predetermined direction, for example. Liquid crystal molecules LC having negative dielectric anisotropy relative to the orientation layers 18 and 24 are aligned substantially vertically (vertical alignment, or VA) at a pretilt angle θp of 3 to 5 degrees in the angled direction of the columns 18a and 24a relative to the normal direction of the orientation layer surfaces. When the liquid crystal layer 50 is driven by applying an AC voltage (a driving signal) between the pixel electrode 15 and the common electrode 23, the liquid crystal molecules LC behave (vibrate) so as to sway in the direction of an electrical field produced between the pixel electrode 15 and the common electrode 23.

Figure 4:
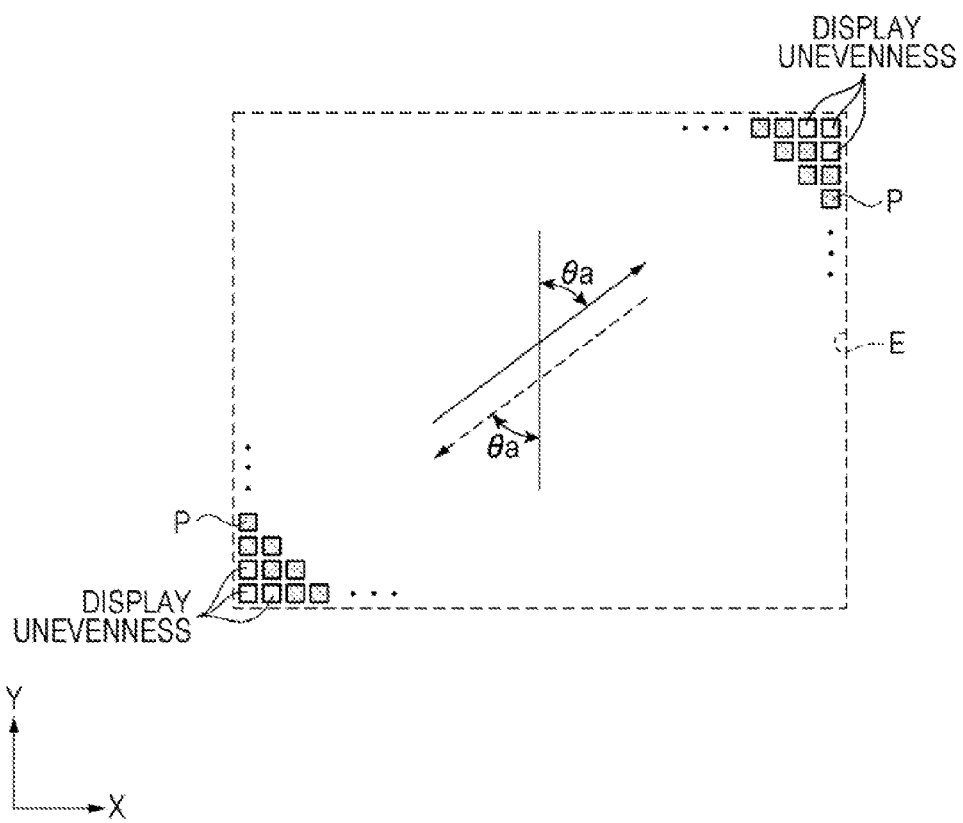
FIG. 4 is a plan view illustrating an overview of a relationship between an angled deposition direction of an inorganic material and display problems caused by ionic impurities.

FIG. 4 is a plan view illustrating an overview of a relationship between an angled deposition direction of an inorganic material and display problems caused by ionic impurities. As shown in FIG. 4, the angled deposition direction of the inorganic material where the columns 18a and 24a are formed is, for example in the element substrate 10, a direction that intersects with the Y direction from the upper-right to the lower-left at a predetermined angle of direction θa, as indicated by a broken line arrow. In the opposing substrate 20 that faces the element substrate 10, the angled deposition direction is a direction that intersects with the Y direction from the lower-left to the upper-right at the predetermined angle of direction θa, as indicated by a solid line arrow. The predetermined angle θa is 45 degrees, for example. Note that the angled deposition direction shown in FIG. 4 is a direction found when viewing the liquid crystal device 100 from the side on which the opposing substrate 20 is disposed.

When the liquid crystal layer 50 is driven and the liquid crystal molecules LC behave (vibrate) as a result, the liquid crystal molecules LC flow, in the angled deposition direction indicated by the broken or solid line arrows shown in FIG. 4, near the borders between the liquid crystal layer 50 and the orientation layers 18 and 24. If the liquid crystal layer 50 contains positive or negative-polarity ionic impurities, the ionic impurities will move toward the corners of the display region E along with the flow of the liquid crystal molecules LC, becoming possibly localized in the corners. The localization of the ionic impurities leads to a drop in the insulation resistance of the liquid crystal layer 50 in the pixels P located in the corners, which in turn leads to a drop in the driving potential of those pixels P; as a result, display unevenness, burn-in due to electrification, and so on will become prominent, as indicated in FIG. 4. Inorganic orientation layers are particularly susceptible to attracting ionic impurities, and thus such display unevenness, burn-in, and so on will be more prominent when inorganic orientation layers are used for the orientation layers 18 and 24 as opposed to organic orientation layers.

In the liquid crystal device 100 according to this embodiment, an ion trapping mechanism that sweeps ionic impurities off from the display region E is provided between the sealant 40 and the display region E is order to ameliorate display unevenness, burn-in, and so on as indicated in FIG. 4. The ion trapping mechanism according to this embodiment will be described hereinafter with reference to FIGS. 5A to 6.

Figure 6:
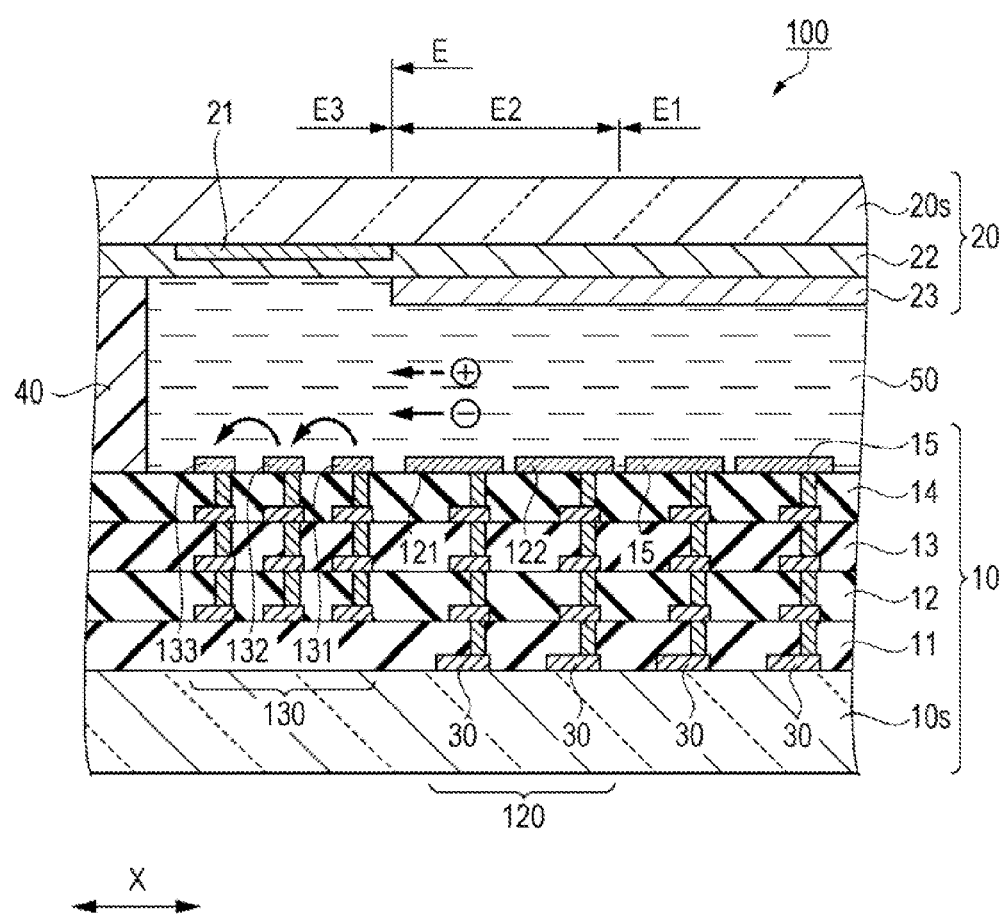
FIG. 6 is a cross-sectional view, taken along a VI-VI line in FIG. 5A, illustrating an overview of the structure of a liquid crystal panel.

FIG. 5A is a plan view illustrating an overview of an arrangement of active display pixels and dummy pixels; FIG. 5B is a wiring diagram illustrating an electricity parting portion and the ion trapping mechanism; and FIG. 6 is a cross-sectional view, taken along a VI-VI line in FIG. 5A, illustrating an overview of the structure of the liquid crystal panel.

As shown in FIG. 5A, the display region E in the liquid crystal device 100 according to this embodiment includes an active display region E1 in which the active display pixels P are disposed and a dummy pixel region E2 that surrounds the active display region E1 and in which a plurality of dummy pixels DP are disposed. The parting portion 21, which has light-blocking properties as described earlier, is provided between the frame-shaped region in which the sealant 40 is disposed and the dummy pixel region E2, and the region in which the parting portion 21 is disposed corresponds to a parting region E3 that operates regardless of whether the liquid crystal device 100 is on or off.

Sets of two dummy pixels DP are disposed in the dummy pixel region E2 on both sides of the active display region E1 in both the X direction and the Y direction. Note that the number of dummy pixels DP disposed in the dummy pixel region E2 is not limited thereto, and any number may be used as long as there is at least one dummy pixel DP on both sides of the active display region E1 in both the X direction and the Y direction. There may be three or more dummy pixels DP, and the number of dummy pixels DP may differ between the X direction and the Y direction. In this embodiment, the dummy pixels DP function as the electricity parting portion, and thus reference numeral 120 will be given to the plurality of dummy pixels DP and the dummy pixels DP will be referred to as an electricity parting portion 120.

As shown in FIG. 5B, each of a plurality of the dummy pixels DP disposed along the edges of the active display region E1 so as to surround the active display region E1 includes a dummy pixel electrode 122. Each of a plurality of the dummy pixels DP disposed so as to surround the plurality of the dummy pixels DP that include the dummy pixel electrodes 122 includes a dummy pixel electrode 121. A plurality of the dummy pixel electrodes 121 and a plurality of the dummy pixel electrodes 122 disposed along the X direction are disposed adjacent to each other in the Y direction, whereas the plurality of dummy pixel electrodes 121 and the plurality of dummy pixel electrodes 122 disposed along the Y direction are disposed adjacent to each other in the X direction. In other words, the electricity parting portion 120 includes the plurality of dummy pixel electrodes 121 and 122 disposed in the X direction and the Y direction, respectively.

An ion trapping mechanism 130 according to this embodiment includes a first electrode 131, a second electrode 132, and a third electrode 133 that are each provided so as to surround the electricity parting portion 120. The first electrode 131, the second electrode 132, and the third electrode 133 each have quadrangular frame shapes when viewed from above; the first electrode 131 is disposed in a position closest to the electricity parting portion 120, the third electrode 133 is disposed in a position farthest from the electricity parting portion 120, and the second electrode 132 is disposed between the first electrode 131 and the third electrode 133.

One end of each wire in a pair of routing wires 135 extending in the Y direction is electrically connected to both ends of a lower side, extending in the X direction, of the first electrode 131 that is quadrangular when viewed from above. The other ends of the respective routing wires 135 are connected to the external connection terminals 104 in the element substrate 10. The external connection terminals 104 to which the pair of routing wires 135 are connected will be distinguished from the other external connection terminals 104 as external connection terminals 104 (It1).

Likewise, one end of each wire in a pair of routing wires 136 extending in the Y direction is electrically connected to both ends of a lower side, extending in the X direction, of the second electrode 132 that is quadrangular when viewed from above. The other ends of the respective routing wires 136 are connected to the external connection terminals 104 in the element substrate 10. The external connection terminals 104 to which the pair of routing wires 136 are connected will be distinguished from the other external connection terminals 104 as external connection terminals 104 (It2).

Likewise, one end of each wire in a pair of routing wires 137 extending in the Y direction is electrically connected to both ends of a lower side, extending in the X direction, of the third electrode 133 that is quadrangular when viewed from above. The other ends of the respective routing wires 137 are connected to the external connection terminals 104 in the element substrate 10. The external connection terminals 104 to which the pair of routing wires 137 are connected will be distinguished from the other external connection terminals 104 as external connection terminals 104 (It3).

The ion trapping mechanism 130 includes the first electrode 131, the second electrode 132, the third electrode 133, and the routing wires 135, 136, and 137 that transmit potentials supplied from the external connection terminals 104 (It1, It2, and It3) to the first electrode 131, the second electrode 132, and the third electrode 133, respectively.

The common electrode 23 is provided so as to include the active display region E1 and overlap with the plurality of the dummy pixel electrodes 121 and 122 in the electricity parting portion 120 when viewed from above. In other words, the common electrode 23 is provided across the display region E, and does not overlap with the first electrode 131, the second electrode 132, and the third electrode 133 of the ion trapping mechanism 130 when viewed from above.

The upper and lower conductive portions 106 are provided on both end sides of the plurality of external connection terminals 104. The upper and lower conductive portions 106 and the external connection terminals 104 on both end sides are electrically connected to each other via routing wires 107. Meanwhile, lead wires 23a that are connected to the upper and lower conductive portions 106 are provided in the common electrode 23. A common potential (LCCOM) is applied to the external connection terminals 104 on both end sides. Accordingly, the external connection terminals 104 electrically connected to the common electrode 23 are referred to as external connection terminals 104 (LCCOM). In other words, the common potential (LCCOM) is applied to the common electrode 23.

Although this embodiment employs a configuration in which potentials are supplied from two each of the external connection terminals 104 (It1, It2, and It3) in order to suppress the potentials supplied to the first electrode 131, the second electrode 132, and the third electrode 133 from varying based on the positions of the first electrode 131, the second electrode 132, and the third electrode 133 on the element substrate 10, it should be noted that the configuration is not limited thereto. One, or three or more, external connection terminals 104 (It1, It2, and It3) may be employed instead.

Furthermore, the first electrode 131 is not limited to an electrically-closed quadrangular electrode when viewed from above. The routing wires 135 may be connected to one end thereof, whereas the other end thereof may be in an open state. The same applies to the second electrode 132 and the third electrode 133, where the routing wires may be connected to one end thereof, whereas the other end thereof may be in an open state, respectively.

In this embodiment, ionic impurities that are localized at the corners of the display region E, as indicated in FIG. 4, are swept to the outside of the display region E by the ion trapping mechanism 130. As such, the common electrode 23 is disposed so as not to overlap with the ion trapping mechanism 130, which will be described in detail later. Accordingly, it is preferable for the positions where the lead wires 23a of the common electrode 23 overlap with the first electrode 131, the second electrode 132, and the third electrode 133 when viewed from above, or in other words, the leading positions of the lead wires 23a in the common electrode 23, to avoid overlapping with the corners of the first electrode 131, the second electrode 132, and the third electrode 133.

As shown in FIG. 6, the element substrate 10 of the liquid crystal device 100 includes a plurality of the wire layers 11 to 14 on the substrate 10s. The pixel electrodes 15 of the pixels P, the dummy pixel electrodes 121 and 122 in the dummy pixels DP (the electricity parting portion 120), and the first electrode 131, the second electrode 132, and the third electrode 133 of the ion trapping mechanism 130 are each formed on the third interlayer insulating film 14. The dummy pixel electrodes 121 and 122, the first electrode 131, the second electrode 132, and the third electrode 133 are formed using the same transparent conductive film as the pixel electrodes 15 (an ITO film, for example) when forming the pixel electrodes 15. When viewed from above, the shape and size of the dummy pixel electrodes 121 and 122, the pitch at which the dummy pixel electrodes 121 and 122 are disposed, and so on are the same as for the pixel electrodes 15.

The first electrode 131, the second electrode 132, and the third electrode 133 are disposed at equal intervals in the X direction. Although not shown in FIG. 6, it should be noted that the first electrode 131, the second electrode 132, and the third electrode 133 are disposed at equal intervals in the Y direction as well. The first electrode 131, the second electrode 132, and the third electrode 133 are connected to interconnects provided in a lower wire layer, which lead to the external connection terminals 104 (It1, It2, and It3), respectively. The electrode portions of the first electrode 131, the second electrode 132, and the third electrode 133 are 4 µm wide, for example, and the pitch at which the first electrode 131, the second electrode 132, and the third electrode 133 are disposed is 8 µm, for example. In other words, an interval between the first electrode 131 and the second electrode 132 and an interval between the second electrode 132 and the third electrode 133 are 4 µm.

Meanwhile, an interval between the first electrode 131 and the dummy pixel electrodes 121 adjacent thereto in the X direction is greater than an interval between the first electrode 131 and the second electrode 132 in the X direction. Although not shown in FIG. 6, an interval between the first electrode 131 and the dummy pixel electrodes 121 adjacent thereto in the Y direction is greater than an interval between the first electrode 131 and the second electrode 132 in the Y direction as well. The intervals between the first electrode 131 and the dummy pixel electrodes 121 in the X direction and the Y direction is no less than 10 µm, for example.

Each of the dummy pixel electrodes 121 and 122 is electrically connected to the corresponding TFT 30 provided in a lower layer. In the case where the liquid crystal device 100 is in a normally-black mode, an AC potential at, for example, a magnitude that does not change the transmissibility of the dummy pixels DP is applied to the plurality of dummy pixel electrodes 121 and 122 via the corresponding TFTs 30 so that the electricity parting portion 120 is continuously in a "black mode (black display)" regardless of the display state of the pixels P in the active display region E1.

As described with reference to FIGS. 3 and 4, when the liquid crystal device 100 is being driven (that is, during a display period), positive-polarity (+) or negative-polarity (−) ionic impurities move from the corners of the active display region E1 to the dummy pixel region E2 with a flow produced by the behavior of the liquid crystal molecules LC.

Meanwhile, AC signals are supplied to the first electrode 131, the second electrode 132, and the third electrode 133 of the ion trapping mechanism 130 so that a direction of an electrical field (electric flux line) produced between adjacent electrodes aligns with a direction from the first electrode 131, which is closer to the electricity parting portion 120 (or the display region E), toward the third electrode 133. The AC signals are signals that shift between a high potential and a low potential, with the common potential (LCCOM) supplied to the common electrode 23 serving as a reference potential. The positive-polarity (+) or negative-polarity (−) ionic impurities are swept from the dummy pixel region E2 to the parting region E3 by the movement of the stated electrical field direction from the first electrode 131 to the third electrode 133.

In the opposing substrate 20 according to this embodiment, the common electrode 23 is not provided in areas opposing the first electrode 131, the second electrode 132, and the third electrode 133 on another side of the liquid crystal layer 50. Accordingly, it is difficult for an electrical field to arise between the common electrode 23 and the first electrode 131, the second electrode 132, and the third electrode 133, respectively. In other words, the ionic impurities are swept into the parting region E3 without the movement of the ionic impurities being inhibited by an electrical field produced between the common electrode 23 and the first electrode 131, the second electrode 132, and the third electrode 133, respectively.

Driving Method of Liquid Crystal Device 100

Figure 7:
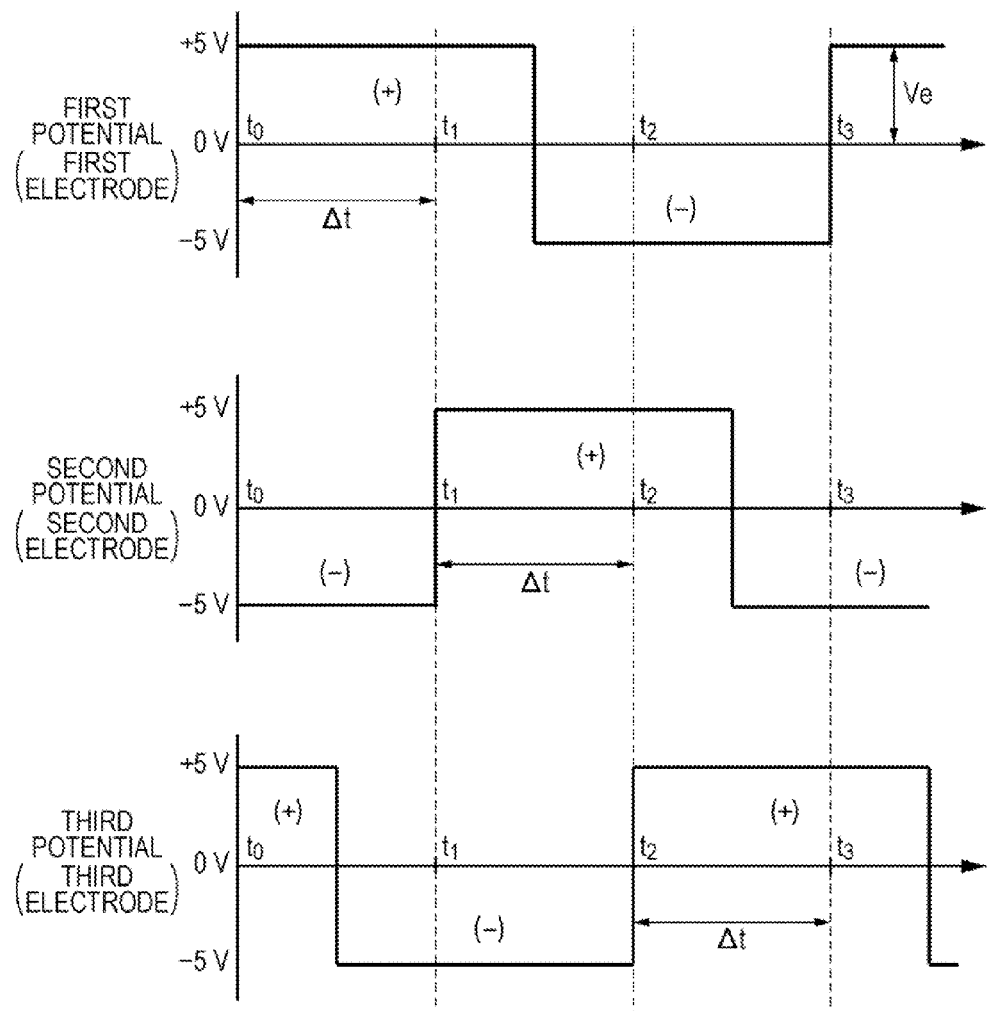
FIG. 7 is a timing chart illustrating square wave AC signals, serving as examples of AC signals supplied to a first electrode, a second electrode, and a third electrode of an ion trapping mechanism.
Figure 8:
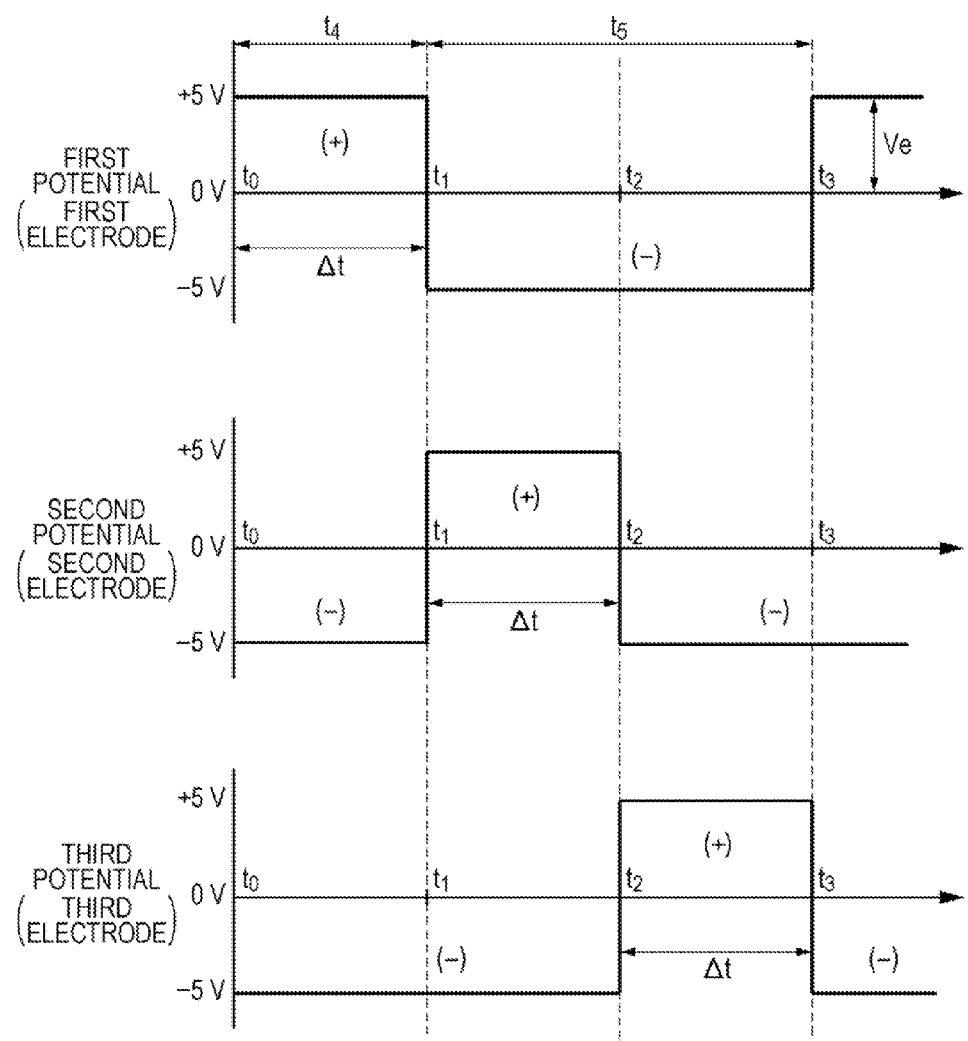
FIG. 8 is a timing chart illustrating square wave AC signals, serving as examples of AC signals supplied to a first electrode, a second electrode, and a third electrode of an ion trapping mechanism.

Next, a driving method for the liquid crystal device 100 will be described with reference to FIGS. 7 and 8, using examples in which specific AC signals are applied to the first electrode 131, the second electrode 132, and the third electrode 133, respectively, via the corresponding external connection terminals 104 (It1, It2, It3). FIGS. 7 and 8 are timing charts indicating examples of the AC signals supplied to the first electrode, the second electrode, and the third electrode of the ion trapping mechanism, respectively. FIGS. 7 and 8 indicate examples of square wave AC signals.

In the driving method for the liquid crystal device 100 according to this embodiment, for example, square wave AC signals are applied to the first electrode 131, the second electrode 132, and the third electrode 133, respectively, as shown in FIG. 7. Specifically, AC signals having the same frequency are applied to the first electrode 131, the second electrode 132, and the third electrode 133 so that after a first potential of the first electrode 131 shifts from the positive-polarity (+) or the reference potential to the negative-polarity (−) but before the first potential shifts to the reference potential or the positive-polarity (+), a second potential of the second electrode 132 shifts from the positive-polarity (+) or the reference potential to the negative-polarity (−), and after the second potential shifts to the negative-polarity (−) but before the second potential shifts to the reference potential or the positive-polarity (+), a third potential of the third electrode 133 shifts from the positive-polarity (+) or the reference potential to the negative-polarity (−); and so that after the first potential of the first electrode 131 shifts from a negative-polarity (−) or the reference potential to the positive-polarity (+) but before the first potential shifts to the reference potential or the negative-polarity (−), the second potential of the second electrode 132 shifts from the negative-polarity (−) or the reference potential to the positive-polarity (+), and after the second potential shifts from the negative-polarity (−) or the reference potential to the positive-polarity (+) but before the second potential shifts to the reference potential or the negative-polarity (−), the third potential of the third electrode 133 shifts from the negative-polarity (−) or the reference potential to the positive-polarity (+).

The AC signal supplied to the second electrode 132 is delayed along a time axis t by a time Δt relative to the AC signal supplied to the first electrode 131. Likewise, the AC signal supplied to the third electrode 133 is delayed along the time axis t by a time Δt relative to the AC signal supplied to the second electrode 132. For example, if the time Δt is ⅓ of a cycle, the phases of the AC signals supplied to the first electrode 131, the second electrode 132, and the third electrode 133, respectively, are shifted from each other by ⅓ of a cycle. To rephrase, a maximum phase shift amount Δt when the phases of the potentials of the first electrode 131, the second electrode 132, and the third electrode 133 are shifted from each other is a value obtained by dividing a single cycle of the AC signal by a number of electrodes n.

Although the square wave AC signals shown in FIG. 7 shift between a high potential (5 V) and a low potential (−5 V) with 0 V serving as the reference potential, the reference potential, high potential, and low potential settings are not limited thereto.

From a time $t_0$ to a time $t_1$ in the timing chart shown in FIG. 7, when the first potential of the first electrode 131 is positive-polarity (+) at 5 V, the second potential of the second electrode 132 that is adjacent to the first electrode 131 is negative-polarity (−) at −5 V. Accordingly, as indicated in FIG. 6, an electrical field oriented from the first electrode 131 toward the second electrode 132 (the electric flux line indicated by the solid line) is produced between the first electrode 131 and the second electrode 132.

Meanwhile, from the time $t_1$ to a time $t_2$, when the second potential of the second electrode 132 is positive-polarity (+) at 5 V, the third potential of the third electrode 133 that is adjacent to the second electrode 132 is negative-polarity (−) at −5 V. Accordingly, as indicated in FIG. 6, an electrical field oriented from the second electrode 132 toward the third electrode 133 is produced between the second electrode 132 and the third electrode 133.

Furthermore, from the time $t_2$ to a time $t_3$, when the third potential of the third electrode 133 is positive-polarity (+) at 5 V, the second potential of the second electrode 132 that is adjacent to the third electrode 133 shifts from positive-polarity (+) at 5 V to negative-polarity (−) at −5 V. Accordingly, it is difficult for an electrical field to arise between the second electrode 132 and the third electrode 133 in a constant direction. In other words, in a period of time from the time to $t_0$ the time $t_3$, which corresponds to a single cycle of the AC signal, a distribution of the electrical field between the first electrode 131, the second electrode 132, and the third electrode 133 scrolls from the first electrode 131 to the third electrode 133 over time. Producing an electrical field in this manner using AC signals will be called "electrical field scrolling" hereinafter.

Ionic impurities may include positive-polarity (+) impurities and negative-polarity (−) impurities. Accordingly, positive-polarity (+) or negative-polarity (−) ionic impurities can be pulled toward the first electrode 131 based on the polarity of the first potential at the first electrode 131. Allowing the ionic impurities that have been pulled toward the first electrode 131 to remain as-is may cause ionic impurities to continue to accumulate and influence the electricity parting portion 120, the display in the active display region E1, and so on, and thus it is preferable for the ionic impurities pulled toward the first electrode 131 to then be moved to the second electrode 132, the third electrode 133, and so on.

In this embodiment, the distribution of the electrical field produced between the electrodes is scrolled from the first electrode 131 to the third electrode 133 by applying the AC signals, whose phases are shifted from each other, to the first electrode 131, the second electrode 132, and the third electrode 133 as described above. As a result, positive-polarity (+) or negative-polarity (−) ionic impurities pulled toward the first electrode 131 can be moved to the third electrode 133. As such, the first electrode 131, the second electrode 132, and the third electrode 133 may also be referred to collectively as ion trapping electrodes 131, 132, and 133.

In order for the ionic impurities to be swept to the third electrode 133 with certainty through electrical field scrolling, it is necessary to set the frequency of the AC signals in consideration of the velocity at which the ionic impurities move. If the velocity of the electrical field scrolling is higher than the velocity at which the ionic impurities move, there is a risk that the ionic impurities will not keep up with the electrical field scrolling and the effect of sweeping away the ionic impurities will drop.

The inventors derived a preferred frequency f (Hz) of the AC signals in the ion trapping mechanism 130 as described hereinafter.

A movement velocity v (m/s) of the ionic impurities in the liquid crystal layer can be found by taking the product of an electrical field intensity e (V/m) between adjacent ion trapping electrodes and a degree of movement μ (m²/V·s) of the ionic impurities, as represented by Formula (1).

That is, $v = e \cdot \mu$ (1)

The electrical field intensity e (V/m) is a value obtained by dividing a potential difference Vn between adjacent ion trapping electrodes by a disposal pitch p (m) of the ion trapping electrodes, as represented by Formula (2).

That is, $e = Vn/p$ (2)

The potential difference Vn between adjacent ion trapping electrodes is equivalent to twice an effective voltage $V_E$ in the AC signals, and thus the following Formula (3) can be derived.

That is, $e = 2V_E/p$ (3)

Note that as shown in FIG. 7, the effective voltage $V_E$ of a square wave AC signal corresponds to a potential relative to the reference potential of the square wave, and is 5 V in this embodiment.

By substituting Formula (3) in Formula (1), the movement velocity v (m/s) of the ionic impurities is expressed as Formula (4).

That is, $v = 2\mu V_E/p$ (4)

A time td over which the ionic impurities move between adjacent ion trapping electrodes is, as indicated by Formula (5), a value obtained by dividing the disposal pitch p of the adjacent ion trapping electrodes by the movement velocity v of the ionic impurities.

That is, $td = p/v = p^2/2\mu V_E$ (5)

Accordingly, the preferred frequency f (Hz) is found by scrolling the electrical field in accordance with the time td over which the ionic impurities move between adjacent ion trapping electrodes. A electrical field scrolling time corresponds to a phase difference Δt between the AC signals, and thus assuming Δt is 1/n cycles as described earlier, the preferred frequency f (Hz) can be derived through the following Formula (6). Here, n represents the number of ion trapping electrodes.

That is, $f = 1/n/td = 2\mu V_E/np^2$ (6)

As described earlier, if it is assumed that the phase difference Δt of the AC signals applied to adjacent ion trapping electrodes is ⅓ a cycle, and the AC signals are square wave AC signals that move between 5 V and −5 V with 0 V as a reference potential, the potential difference Vn between adjacent ion trapping electrodes in the ion trapping mechanism 130 is 10 V. Furthermore, assuming that the disposal pitch p between the ion trapping electrodes in the ion trapping mechanism 130 is 8 μm and the degree of movement μ of the ionic impurities is $2.2 \times 10^{-10}$ (m²/V·s), the preferred frequency f is approximately 12 Hz, based on Formula (6).

Note that the value of the degree of movement μ of the ionic impurities is discussed in, for example, A. Sawada, A. Manabe, and S. Naemura, "A Comparative Study on the Attributes of Ions in Nematic and Isotropic Phases", Jpn. J. Appl. Phys. Vol. 40, p 220-p 224 (2001).

Increasing the frequency f of the AC signal beyond 12 Hz results in the ionic impurities being unable to keep up with the electrical field scrolling, and thus it is preferable for the frequency f to be equal to 12 Hz or less than 12 Hz. On the other hand, an extremely low frequency f will result in a DC current being applied between the ion trapping electrodes, resulting in the breakdown of liquid crystals, display problems such as burn-in or spotting, or the like, and is thus not preferable. The preferred frequency f can be increased if the disposal pitch of the ion trapping electrodes 131, 132, and 133 is reduced beyond 8 μm. Furthermore, to sweep the ionic impurities further away from the display region E, it is preferable to provide even more than three ion trapping electrodes.

Meanwhile, when the width of each of the ion trapping electrodes 131, 132, and 133 is taken as L and each gap between adjacent ion trapping electrodes 131, 132, and 133 is taken as S, it is preferable for the width L to be equal to the gap S or lower than the gap S. This is because if the width L is greater than the gap S, the time in which the ionic impurities move will be greater on ion trapping electrodes where the electrical field does not easily move than between ion trapping electrodes where the electrical field moves, resulting in a risk that the effect of sweeping away the ionic impurities will drop.

The AC signals applied to the ion trapping electrodes 131, 132, and 133 are not limited to the square wave AC signals indicated in FIG. 7. The square waves illustrated in FIG. 8, for example, may be employed as well.

In the square wave AC signals in FIG. 7, the time for which the potential is positive-polarity (+) is equal to the time for which the potential is negative-polarity (−); however, for example, as shown in FIG. 8, AC signals set so that a time $t_5$ for which the potential is negative-polarity (−) is longer than a time $t_4$ for which the potential is positive-polarity (+) may be employed instead. Depending on the process for manufacturing the liquid crystal device 100, the liquid crystal layer 50 may contain both positive-polarity (+) and negative-polarity (−) ionic impurities, and it is known that positive-polarity (+) ionic impurities cause a greater drop in display quality than negative-polarity (−) ionic impurities. Accordingly, applying AC signals in which the time $t_5$ for which the potential is negative-polarity (−) to each of the ion trapping electrodes 131, 132, and 133 makes it possible to effectively sweep the positive-polarity (+) ionic impurities away.

Figure 9:
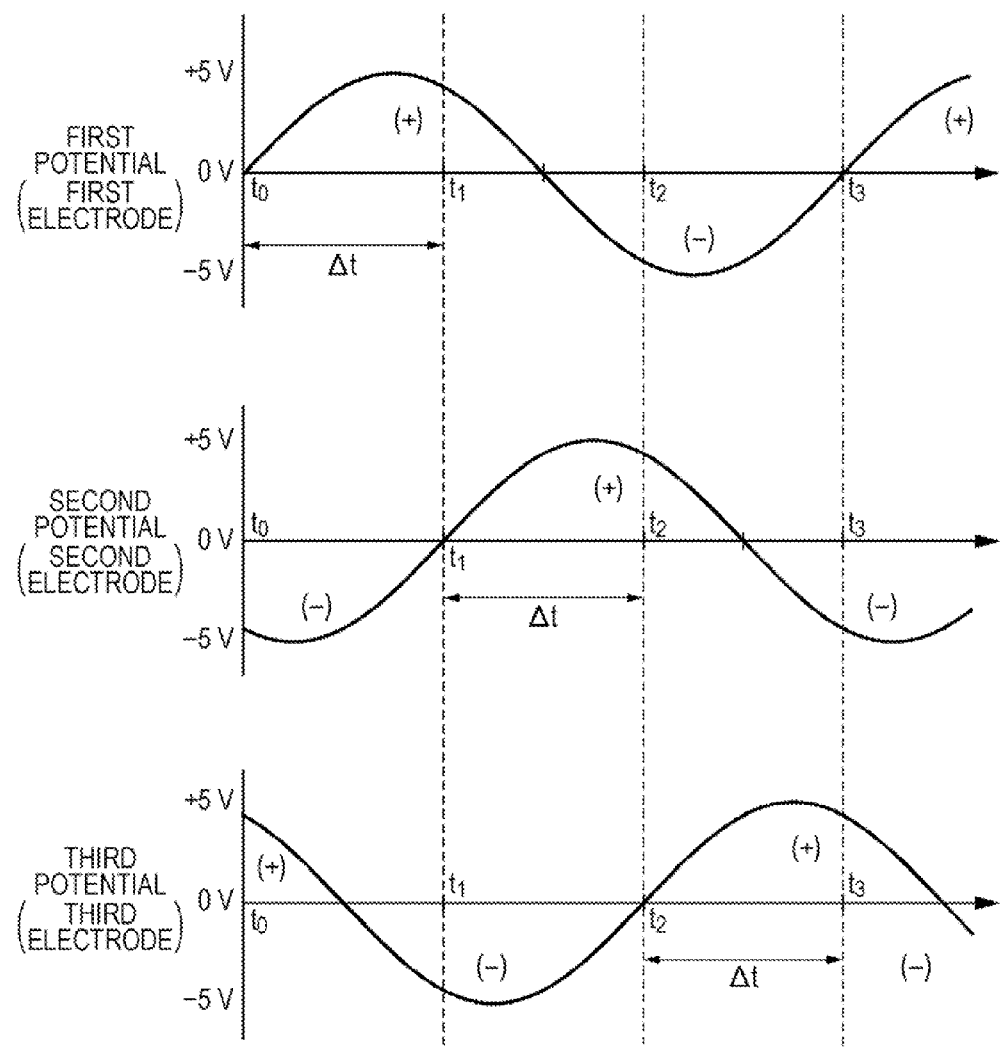
FIG. 9 is a timing chart illustrating sine wave AC signals, serving as examples of AC signals supplied to a first electrode, a second electrode, and a third electrode of an ion trapping mechanism.

Furthermore, although the square wave AC signals may be oscillated between, for example, two potential values, or 5 V and −5 V, relative to a reference potential of 0 V, as indicated in FIGS. 7 and 8, the waveforms may instead be set to move among three or more different potentials. Through this, the ionic impurities can be moved smoothly from the first electrode 131 to the third electrode 133 through the second electrode 132 in the ion trapping mechanism 130. Furthermore, triangular wave AC signals can also be employed in addition to the square wave AC signals indicated in FIGS. 7 and 8. Further still, the AC signals applied to the respective ion trapping electrodes 131, 132, and 133 may be sine waves having mutually different phases within a single time cycle, as shown in FIG. 9. However, compared to an analog circuit that generates an analog signal such as a sine wave, a digital circuit that generates a square wave makes it easier to simplify the circuit configuration.

Meanwhile, as long as the AC signals have the same frequency, the amplitude of the AC signals applied to the first electrode 131, the second electrode 132, and the third electrode 133, or in other words, the maximum positive-polarity potentials and the maximum negative-polarity potential relative to the reference potential, need not necessarily be equal. For example, an AC signal that oscillates between 5 V and −5 V relative to a reference potential of 0 V is applied to the first electrode 131 as mentioned earlier. However, an AC signal that oscillates between 7.5 V and −7.5 V relative to the reference potential of 0 V is applied to the second electrode 132, and an AC signal that oscillates between 10 V and −10 V relative to the reference potential of 0 V is applied to the third electrode 133. By increasing the amplitude of the AC signals applied to the three ion trapping electrodes 131, 132, and 133 as the ion trapping electrodes 131, 132, and 133 progress away from the display region E in this manner makes it possible to effectively sweep away the ionic impurities.

As described earlier, driving the pixels P results in the liquid crystal molecules LC flowing within the liquid crystal layer 50, and the ionic impurities move through the display region E as a result of this flow. The velocity of the flow is thought to depend on the frequency of the driving signal that drives the pixels P. It is preferable for the movement of the electrical fields produced between the ion trapping electrodes 131, 132, and 133 to be slower in order to pull the ionic impurities, which move due to the stated flow, from the display region E to the ion trapping electrodes 131, 132, and 133 with certainty. In other words, it is preferable for the frequency f (Hz) of the AC signals applied to the ion trapping electrodes 131, 132, and 133 to be lower than the frequency of the driving signal that drives the pixels P.

On the other hand, the degree of movement μ (movement velocity v) of the ionic impurities depends on the temperature. Thus if the temperature when the liquid crystal device 100 is actually driven is higher than a normal temperature, an effect in which the ionic impurities are swept away can be achieved even if the frequency f is set to be higher than 12 Hz.

Figure 10:
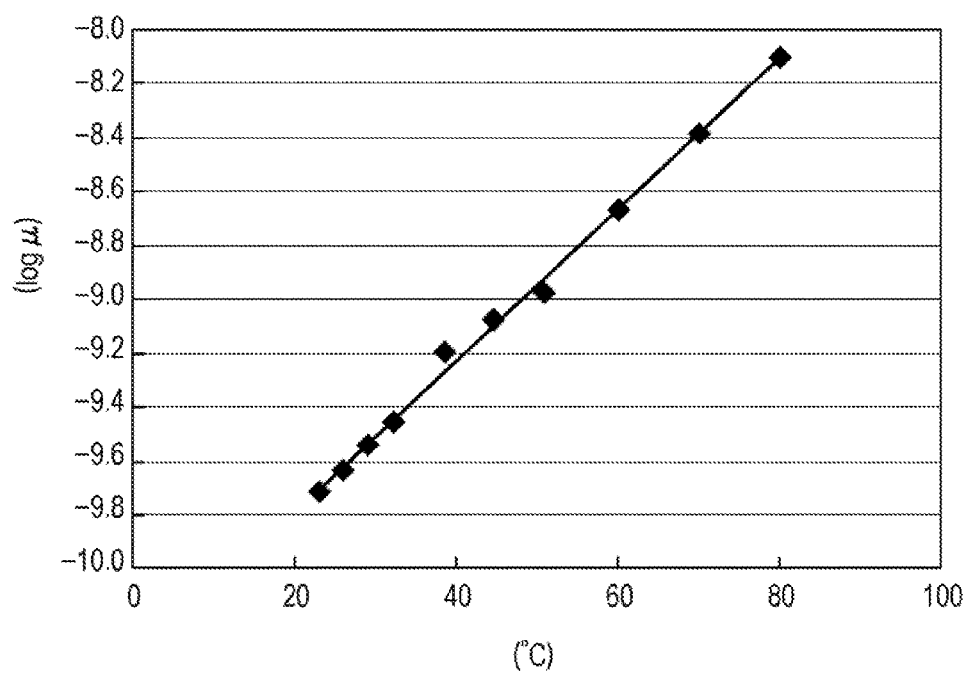
FIG. 10 is a graph illustrating a relationship between a degree of movement of ionic impurities and a temperature in a liquid crystal layer.

FIG. 10 is a graph illustrating a relationship between the degree of movement μ of the ionic impurities and the temperature. Note that the graph shown in FIG. 10 has been obtained by referring to values of the degree of movement μ of the ionic impurities discussed in the aforementioned A. Sawada, A. Manabe, and S. Naemura, "A Comparative Study on the Attributes of Ions in Nematic and Isotropic Phases", Jpn. J. Appl. Phys. Vol. 40, p 220-p 224 (2001).

As shown in FIG. 10, the value of the degree of movement μ of the ionic impurities when the temperature is 25° C. is approximately $2.2 \times 10^{-10}$ (m²/V·s), and the value of log μ is −9.6. As opposed to this, the value of the degree of movement μ of the ionic impurities when the temperature is 60° C. is approximately $2.2 \times 10^{-9}$ (m²/V·s), and the value of log μ is −8.7. In other words, the degree of movement μ of the ionic impurities at 60° C. is approximately 10 times the degree of movement μ at 25° C. A temperature of 60° C. is focused on here in consideration of the temperature when the liquid crystal device 100 is used as a light valve in a projection-type display apparatus, which will be described later.

If $μ=2.2 \times 10^{-9}$ (m²/V·s) when n=3, $V_E$=5 V, p=8 μm, and the temperature is 60° C. is applied to the aforementioned Formula (6), the optimal frequency f is approximately 113 Hz. In this state, it is thought that an effect of sweeping away the ionic impurities can be achieved despite the optimal frequency f of the AC signals applied to the ion trapping electrodes 131, 132, and 133 being greater than the driving frequency of 60 Hz in this embodiment. To rephrase, it is thought that if the driving frequency is set to a higher frequency than the optimal frequency f of the AC signals, such as 120 Hz, the ionic impurities can be swept away in a more effective manner.

Next, a method (means) for applying the AC signals will be described. In this embodiment, AC signals having the same frequency but with mutually shifted phases are applied to the first electrode 131, the second electrode 132, and the third electrode 133, respectively, of the ion trapping mechanism 130 from the exterior via the three external connection terminals 104 (It1, It2, and It3), as indicated in FIG. 5B;

however, the method (means) for applying AC signals having the same frequency but with mutually shifted phases is not limited thereto.

Figure 11:
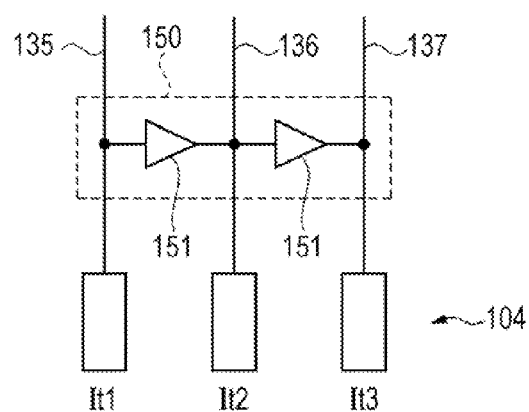
FIG. 11 is a circuit diagram illustrating the configuration of a delay circuit.

FIG. 11 is a circuit diagram illustrating the configuration of a delay circuit. As shown in FIG. 11, the liquid crystal device 100 may be configured including a delay circuit 150 having a delay element 151 provided between the routing wire 135 and the routing wire 136 and a delay element 151 provided between the routing wire 136 and the routing wire 137. A circuit configuration including a capacitance element (C) and an inductor element (L), a circuit configuration including a resistance (R) and a capacitance element (C), and so on can be given as examples of the delay elements 151. According to the delay circuit 150, a first AC signal is applied to the first electrode 131 via the routing wire 135 as a result of the first AC signal being supplied to the external connection terminal 104 (It1). Likewise, a second AC signal, whose phase is shifted from the first AC signal, is applied to the second electrode 132 via the routing wire 136 as a result of the first AC signal being transmitted to the routing wire 136 via the delay element 151. Furthermore, a third AC signal, whose phase is shifted from the second AC signal, is applied to the third electrode 133 via the routing wire 137 as a result of the second AC signal being transmitted to the routing wire 137 via the delay element 151.

Accordingly, it is only necessary to generate the first AC signal in an external circuit and supply that signal to the external connection terminal 104 (It1), which makes it possible to simplify the circuit configuration of the device as a whole.

According to the liquid crystal device 100 and the driving method thereof in the first embodiment described thus far, the following effects are achieved.

1. The ion trapping mechanism 130 is provided between the electricity parting portion 120 and the sealant 40, and AC signals having the same frequency but whose phases in an amount of time corresponding to a single cycle are shifted relative to each other are applied to the first electrode 131, the second electrode 132, and the third electrode 133, respectively. Accordingly, the distribution of an electrical field generated between the ion trapping electrodes 131, 132, and 133 is scrolled from the first electrode 131 to the third electrode 133, and as a result of the electrical field scrolling, ionic impurities within the liquid crystal layer 50 are swept away from the display region E and into the parting region E3 in which the ion trapping electrodes 131, 132, and 133 are disposed.

2. The frequency f of the AC signals applied to the ion trapping electrodes 131, 132, and 133, respectively, is derived from the aforementioned Formula (6), and is set to no more than 12 Hz, which is lower than the frequency of an image signal (a driving signal) at the pixels P (for example, 60 Hz), in the case where the temperature is a normal temperature. In the case where the movement velocity v of the ionic impurities in the liquid crystal layer 50 and the temperature of 60° C. occurring when the device is actually used, the frequency f is set to no more than approximately 113 Hz. Accordingly, the ionic impurities can be swept away to the parting region E3 with certainty.

3. A gap between the first electrode 131 of the ion trapping mechanism 130 and the dummy pixel electrodes 121 of the electricity parting portion 120 is greater than a gap between the first electrode 131 and the second electrode 132. Accordingly, it is difficult for the movement of the ionic impurities to be inhibited by an electrical field produced between the first electrode 131 and the dummy pixel electrodes 121, and thus the ionic impurities can be moved from the first electrode 131 to the second electrode 132 smoothly.

4. The common electrode 23 is not provided in areas opposing the ion trapping electrodes 131, 132, and 133 on the opposite side of the liquid crystal layer 50. Accordingly, it is difficult for an electrical field to be produced between the ion trapping electrodes 131, 132, and 133 and the common electrode 23, and thus the ionic impurities can be swept away to the parting region E3 with certainty by the electrical field scrolling produced between the ion trapping electrodes 131, 132, and 133.

5. The parting portion 21, which has light-blocking properties, is provided in the parting region E3, and thus even if ionic impurities are swept into and accumulate in the parting region E3 and the optical properties of the liquid crystal layer 50 in the parting region E3 change as a result, the display in the display region E, which includes the electricity parting portion 120, is not affected.

Second Embodiment

Figure 12:
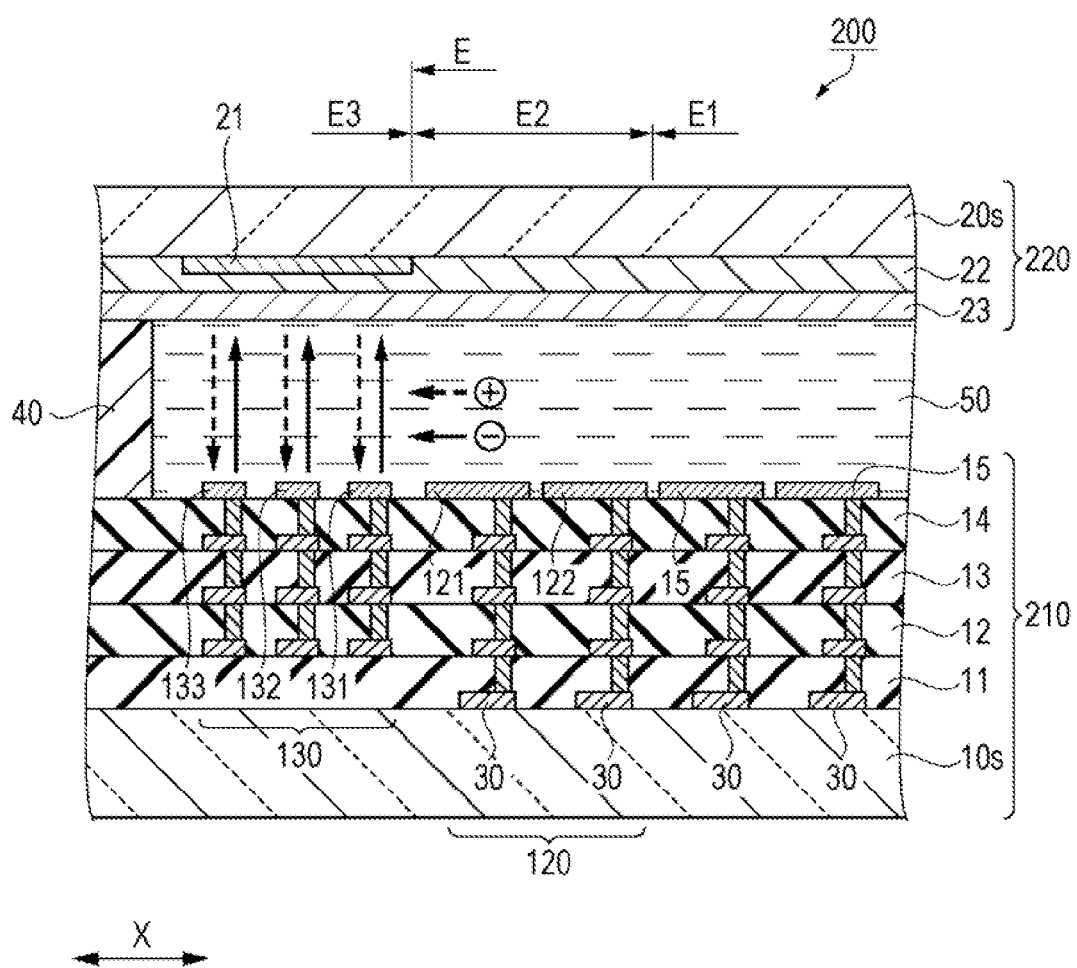
FIG. 12 is a cross-sectional view illustrating the overall structure of a liquid crystal device according to a second embodiment.

Next, a liquid crystal device according to a second embodiment will be described with reference to FIG. 12. FIG. 12 is a cross-sectional view illustrating the overall structure of the liquid crystal device according to the second embodiment. Note that FIG. 12 is a general cross-sectional view corresponding to that shown in FIG. 6 and described in the first embodiment. In the liquid crystal device according to the second embodiment, the common electrode 23 in the opposing substrate 20 is disposed in a different manner than in the liquid crystal device 100 according to the first embodiment. Configurations that are the same as those in the first embodiment are given the same reference numerals, and detailed descriptions thereof will be omitted.

As shown in FIG. 12, a liquid crystal device 200 according to the second embodiment includes the liquid crystal layer 50, provided in a gap between an element substrate 210 and an opposing substrate 220 that are affixed to each other using the sealant 40.

The pixel electrodes 15, the dummy pixel electrodes 121 and 122, and the ion trapping electrodes 131, 132, and 133 are each disposed upon the third interlayer insulating film 14 of the element substrate 210.

In the opposing substrate 220, the common electrode 23 is formed so as to span across the display region E and the parting region E3. In other words, the ion trapping electrodes 131, 132, and 133 and the common electrode 23 are disposed so as to oppose each other, with the liquid crystal layer 50 interposed therebetween, in the parting region E3.

As in the first embodiment, AC signals having the same frequency but mutually different phases in an amount of time corresponding to a single cycle (for example, the square waves indicated in FIG. 7) are applied to the ion trapping electrodes 131, 132, and 133, respectively. As such, an electrical field is produced between the first electrode 131 and the common electrode 23, as indicated by the solid-line or dotted-line arrows, depending on the polarity of the first potential at the first electrode 131. An electrical field is also produced between the second electrode 132 and third electrode 133 and the common electrode 23 in the same manner as with the first electrode 131, as indicated by the solid-line or dotted-line arrows. Because the AC signals having mutually different phases are applied to the ion trapping electrodes 131, 132, and 133, these electrical fields indicated by the solid-line or dotted-line arrows are scrolled, over time, from the first electrode 131, which is closest to the display region E, toward the third electrode 133.

Compared to the liquid crystal device 100 according to the first embodiment, the liquid crystal device 200 according to the second embodiment is affected by the strength of the electrical fields due to the thickness of the liquid crystal layer 50; however, as in the first embodiment, the ionic impurities in the display region E can be swept away to the parting region E3 by the ion trapping mechanism 130.

In addition, it is not necessary to perform patterning for causing the common electrode 23 to correspond to the display region E and provide the lead wires 23a as in the liquid crystal device 100 according to the first embodiment, and thus the liquid crystal device 200 has an advantage in that the configuration of the device can be simplified.

Third Embodiment

Figure 13:
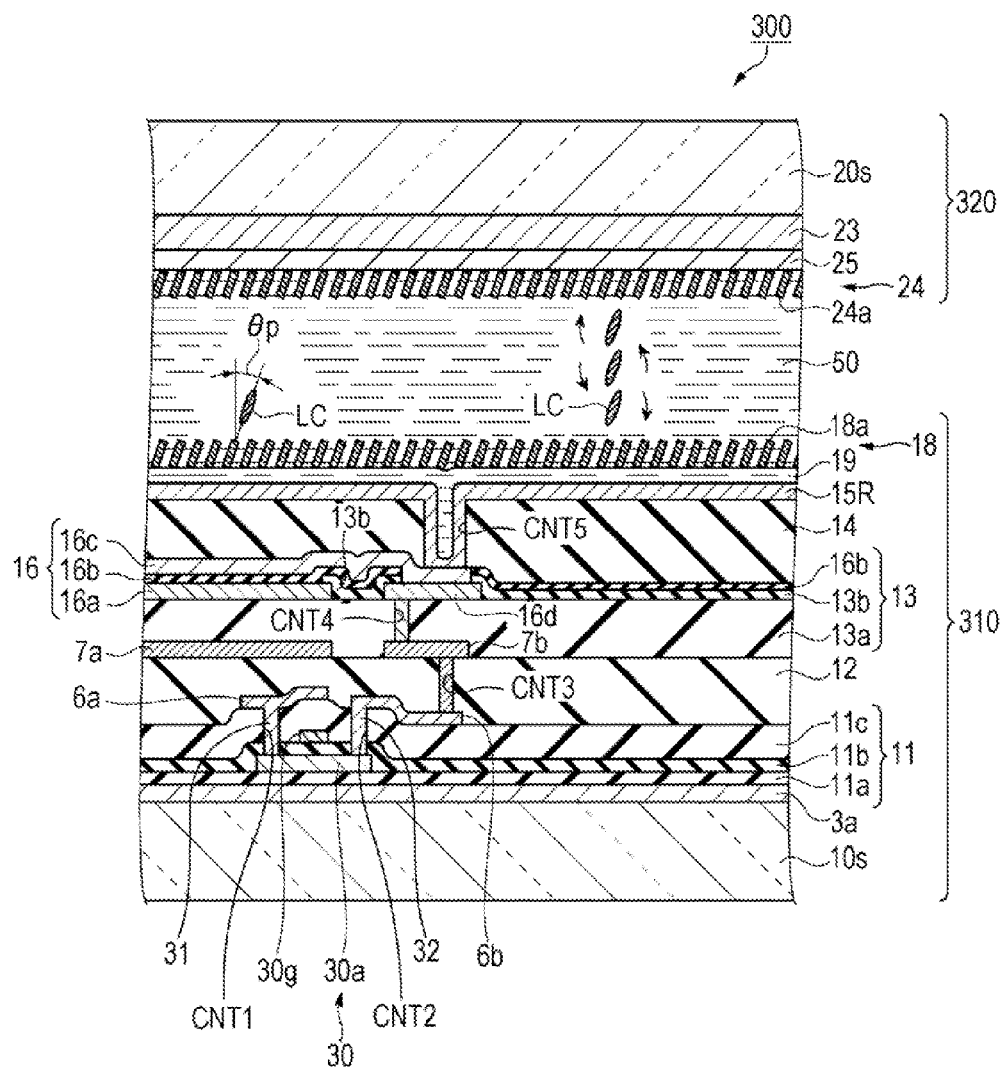
FIG. 13 is a cross-sectional view illustrating the overall structure of a liquid crystal device according to a third embodiment.

Next, a liquid crystal device according to a third embodiment will be described with reference to FIG. 13. FIG. 13 is a cross-sectional view illustrating the overall structure of the liquid crystal device according to the third embodiment. Unlike the liquid crystal device 100 according to the first embodiment, which is transmissive, the liquid crystal device according to the third embodiment is reflective. Configurations that are the same as those in the first embodiment are given the same reference numerals, and detailed descriptions thereof will be omitted.

Like the liquid crystal device 100 according to the first embodiment, a liquid crystal device 300 according to the third embodiment includes the active display region E1 in which the plurality of pixels P are disposed, the dummy pixel region E2 in which the plurality of dummy pixels DP are disposed, and the parting region E3 in which the parting portion 21 and the ion trapping mechanism 130 are disposed.

As shown in FIG. 13, pixel electrodes 15R of an element substrate 310 are formed upon the third interlayer insulating film 14 from, for example, Al (aluminum), an alloy containing Al, or the like that reflects light. Each pixel electrode 15R is also electrically connected to the second capacitance electrode 16c of the storage capacitance 16 via the contact hole CNT5 provided in the third interlayer insulating film 14.

An inorganic insulating film 19 is formed so as to cover the pixel electrodes 15R. The orientation layer 18, which is configured of a collection of the columns 18a grown by deposing silicon oxide at an angle, is formed on the surface of the inorganic insulating film 19.

An inorganic insulating film 25 is formed so as to cover the common electrode 23, which is formed using a transparent conductive film such as an ITO film on an opposing substrate 320. The orientation layer 24, which is configured of a collection of the columns 24a grown by deposing silicon oxide at an angle, is formed on the surface of the inorganic insulating film 25.

The liquid crystal layer 50, which is configured of the liquid crystal molecules LC having a negative dielectric anisotropy, is interposed between the element substrate 310 on which the orientation layer 18 is formed and the opposing substrate 320 on which the orientation layer 24 is formed.

The inorganic insulating films 19 and 25 are formed by deposing silicon oxide, for example. Covering the surface of the pixel electrodes 15R, whose work function differs from the common electrode 23, with the inorganic insulating film 19, and then covering the surface of the common electrode 23 with the inorganic insulating film 25 make it possible to ameliorate a problem where the common potential (LC-COM) changes (shifts) due to differences in the work function when the inorganic insulating films 19 and 25 are not present.

The ion trapping electrodes 131, 132, and 133 are formed in the same layer as the pixel electrodes 15R. Accordingly, the ion trapping electrodes 131, 132, and 133 are also covered by the inorganic insulating film 19. As in the first embodiment, AC signals that shift between a high potential and a low potential with the common potential (LCCOM) of the common electrode 23 serving as a reference potential, and whose phases in an amount of time corresponding to a single cycle are shifted relative to each other are applied to the ion trapping electrodes 131, 132, and 133, and thus it is more difficult for a drop in the potential to be caused by the presence of the inorganic insulating films 19 and 25 than in the case where a DC potential is applied to the ion trapping electrodes 131, 132, and 133. Accordingly, the reflective liquid crystal device 300 that is capable of sweeping away ionic impurities from the display region E to the parting region E3 with certainty can be provided. Note that like the liquid crystal device 100 according to the first embodiment, the common electrode 23 of the opposing substrate 320 is formed so as to span across the display region E, and is not formed in the parting region E3. In other words, the ion trapping electrodes 131, 132, and 133 and the common electrode 23 are not disposed so as to oppose each other with the liquid crystal layer 50 interposed therebetween.

Fourth Embodiment

Electronic Device

Figure 14:
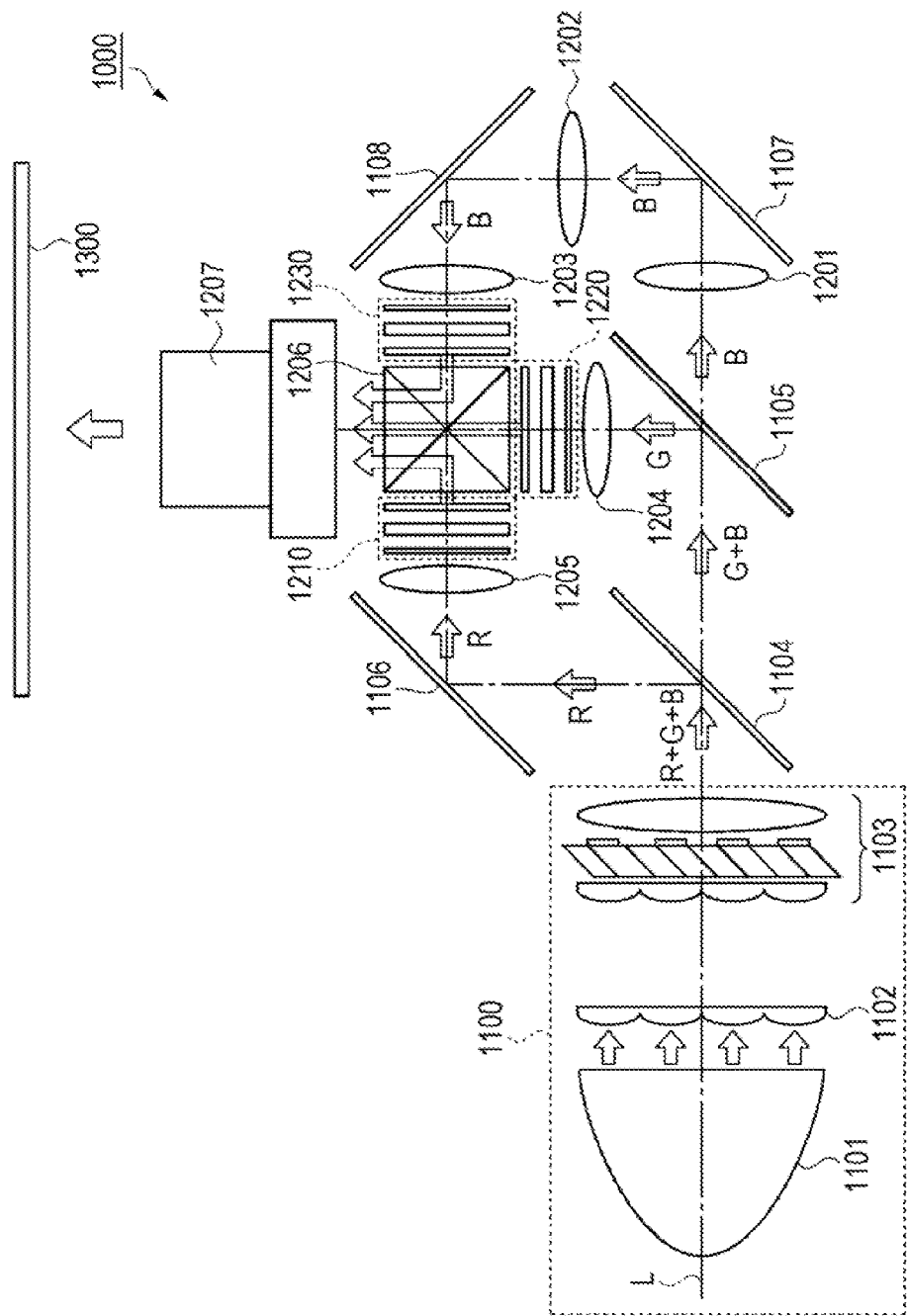
FIG. 14 is a schematic diagram illustrating the configuration of a projection-type display apparatus according to a fourth embodiment.

Next, a projection-type display apparatus serving as an electronic device according to a fourth embodiment will be described with reference to FIG. 14. FIG. 14 is a schematic diagram illustrating the configuration of a projection-type display apparatus according to the fourth embodiment.

As shown in FIG. 14, a projection-type display apparatus 1000 serving as an electronic device according to this embodiment includes a polarized illumination device 1100 disposed along a system optical axis L, two dichroic mirrors 1104 and 1105 serving as optical separating elements, three reflective mirrors 1106, 1107, and 1108, five relay lenses 1201, 1202, 1203, 1204, and 1205, three transmissive liquid crystal light valves 1210, 1220, and 1230 serving as optical modulation units, a cross dichroic prism 1206 serving as a light synthesizing element, and a projection lens 1207.

The polarized illumination device 1100 is generally configured of a lamp unit 1101 that serves as a light source and is configured of a white light source such as an ultra-high-pressure mercury lamp, a halogen lamp, or the like, an integrator lens 1102, and a polarization conversion element 1103.

Of a polarized light flux emitted from the polarized illumination device 1100, the dichroic mirror 1104 reflects red (R) light and transmits green (G) and blue (B) light. The other dichroic mirror 1105 reflects the green (G) light and transmits the blue (B) light, which have passed through the dichroic mirror 1104.

The red (R) light reflected by the dichroic mirror 1104 enters the liquid crystal light valve 1210 via the relay lens 1205 after being reflected by the reflective mirror 1106.

The green (G) light reflected by the dichroic mirror 1105 enters the liquid crystal light valve 1220 via the relay lens 1204.

The blue (B) light transmitted by the dichroic mirror 1105 enters the liquid crystal light valve 1230 via an optical guide configured of the three relay lenses 1201, 1202, and 1203 and the two reflective mirrors 1107 and 1108.

The liquid crystal light valves 1210, 1220, and 1230 are disposed so as to face respective planes of incidence of each color of light in the cross dichroic prism 1206. The colored light that has entered the liquid crystal light valves 1210, 1220, and 1230 is modulated based on image information (image signals) and is emitted toward the cross dichroic prism 1206. This prism is formed by affixing four right-angle prisms, with a dielectric multilayer film that reflects red light and a dielectric multilayer film that reflects blue light being formed in a cross shape on inner surfaces thereof. The three colors of light are synthesized by these dielectric multilayer films, forming light that expresses a color image. The synthesized light is projected onto a screen 1300 by the projection lens 1207, which is a projecting optical system, and an image is displayed in an enlarged manner as a result.

The liquid crystal light valve 1210 employs the liquid crystal device 100 according to the first embodiment or the liquid crystal device 200 according to the second embodiment, which include the aforementioned ion trapping mechanism 130. A pair of polarizing elements are disposed, with a gap therebetween, in a cross Nicol pattern on the entry and exit sides of the colored light in the liquid crystal panel 110. The same applies to the liquid crystal light valves 1220 and 1230.

According to this projection-type display apparatus 1000, the aforementioned liquid crystal device 100 or liquid crystal device 200 is used as the liquid crystal light valves 1210, 1220, and 1230, and thus a projection-type display apparatus 1000 that ameliorates display problems caused by ionic impurities and provides superior display quality can be provided.

Fifth Embodiment

Electronic Device

Figure 15:
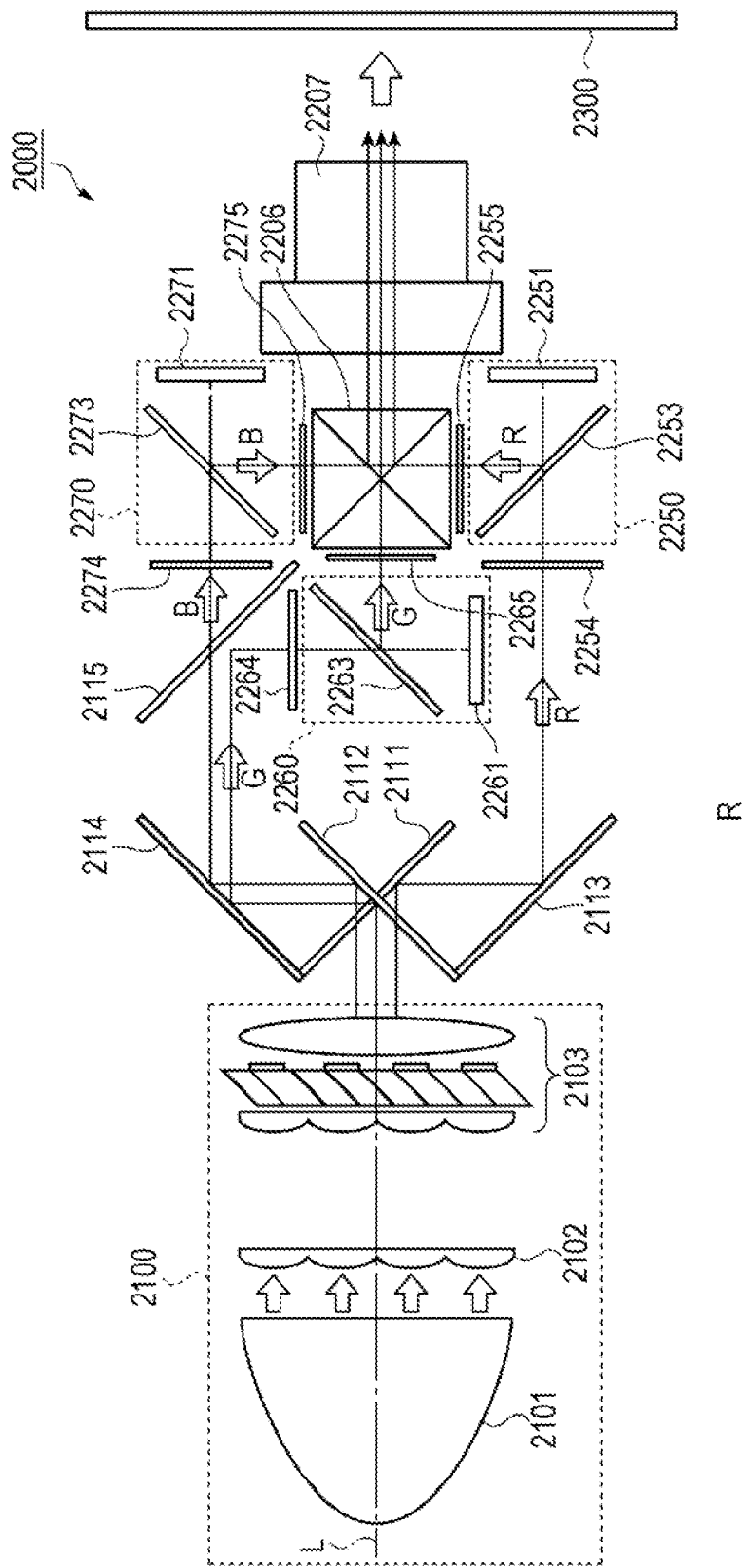
FIG. 15 is a schematic diagram illustrating the configuration of a projection-type display apparatus according to a fifth embodiment.

Next, a projection-type display apparatus serving as an electronic device according to a fifth embodiment will be described with reference to FIG. 15. FIG. 15 is a schematic diagram illustrating the configuration of a projection-type display apparatus according to the fifth embodiment.

As shown in FIG. 15, a projection-type display apparatus 2000 serving as an electronic device according to this embodiment includes a polarized illumination device 2100 disposed along the system optical axis L, three dichroic mirrors 2111, 2112, and 2115, two reflective mirrors 2113 and 2114, three reflective liquid crystal light valves 2250, 2260, and 2270 serving as optical modulation units, a cross dichroic prism 2206, and a projection lens 2207.

The polarized illumination device 2100 is generally configured of a lamp unit 2101 that serves as a light source and is configured of a white light source such as a halogen lamp or the like, an integrator lens 2102, and a polarization conversion element 2103.

A polarized light flux emitted from the polarized illumination device 2100 is incident on the dichroic mirror 2111 and the dichroic mirror 2112 that are disposed orthogonal to each other. The dichroic mirror 2111 that serves as an optical separating element reflects red (R) light of the polarized light flux that is incident thereon. The dichroic mirror 2112 that serves as another optical separating element reflects green (G) light and blue (B) light of the polarized light flux that is incident thereon.

The reflected red (R) light is again reflected by the reflective mirror 2113 and enters the liquid crystal light valve 2250. Meanwhile, the reflected green (G) light and blue (B) light are again reflected by the reflective mirror 2114 and are then incident on the dichroic mirror 2115 serving as an optical separating element. The dichroic mirror 2115 reflects the green (G) light and transmits the blue (B) light. The reflected green (G) light enters the liquid crystal light valve 2260. The transmitted blue (B) light enters the liquid crystal light valve 2270.

The liquid crystal light valve 2250 includes a reflective liquid crystal panel 2251 and a wire grid polarization plate 2253 serving as a reflective polarizing element.

The liquid crystal light valve 2250 is disposed so that the red (R) light reflected by the wire grid polarization plate 2253 is incident vertically on the plane of incidence of the cross dichroic prism 2206. Furthermore, an auxiliary polarization plate 2254 that modifies the degree of polarization of the wire grid polarization plate 2253 is disposed on the side of the liquid crystal light valve 2250 on which the red (R) light enters, and another auxiliary polarization plate 2255 is disposed on the light exit side of the red (R) light, along the plane of incidence of the cross dichroic prism 2206. Note that the pair of auxiliary polarization plates 2254 and 2255 can be omitted in the case where a polarizing beam splitter is used as the reflective polarizing element.

The configuration of this reflective liquid crystal light valve 2250 and the arrangement of the respective constituent elements thereof is the same in the other reflective liquid crystal light valves 2260 and 2270. In other words, the liquid crystal light valve 2260 includes a reflective liquid crystal panel 2261 and a wire grid polarization plate 2263, an auxiliary polarization plate 2264 is disposed on the side of the wire grid polarization plate 2263 on which the green (G) light is incident, and another auxiliary polarization plate 2265 is disposed on the side of the wire grid polarization plate 2263 from which the green (G) light exits, along the plane of incidence of the cross dichroic prism 2206.

Likewise, the liquid crystal light valve 2270 includes a reflective liquid crystal panel 2271 and a wire grid polarization plate 2273, an auxiliary polarization plate 2274 is disposed on the side of the wire grid polarization plate 2273 on which the blue (B) light is incident, and another auxiliary polarization plate 2275 is disposed on the side of the wire grid polarization plate 2273 from which the blue (B) light exits, along the plane of incidence of the cross dichroic prism 2206.

The respective color lights that enter the liquid crystal light valves 2250, 2260, and 2270 are modulated based on image information, and once again enter the cross dichroic prism 2206 via the wire grid polarization plates 2253, 2263, and 2273. The respective color lights are synthesized by the cross dichroic prism 2206, the synthesized light is projected onto a screen 2300 by the projection lens 2207, and an image is displayed in an enlarged manner as a result.

In this embodiment, the reflective liquid crystal device 300 according to the aforementioned third embodiment is employed as the liquid crystal light valves 2250, 2260, and 2270.

According to the projection-type display apparatus 2000, the reflective liquid crystal device 300 is used as the liquid crystal light valves 2250, 2260, and 2270; as a result, a bright image can be projected, display problems caused by ionic impurities can be ameliorated, and the reflective projection-type display apparatus 2000 having superior display quality can be provided.

The invention is not intended to be limited to the aforementioned embodiments, and many suitable changes can be made thereto without departing from the essence or spirit of the invention as set forth in the appended aspects of the invention and the specification as a whole; driving methods for liquid crystal devices and electronic devices that apply such liquid crystal devices derived from such modifications also fall within the technical scope of the invention. Many variations can also be considered in addition to the aforementioned embodiments. Several such variations will be described hereinafter.

First Variation

Figure 16:
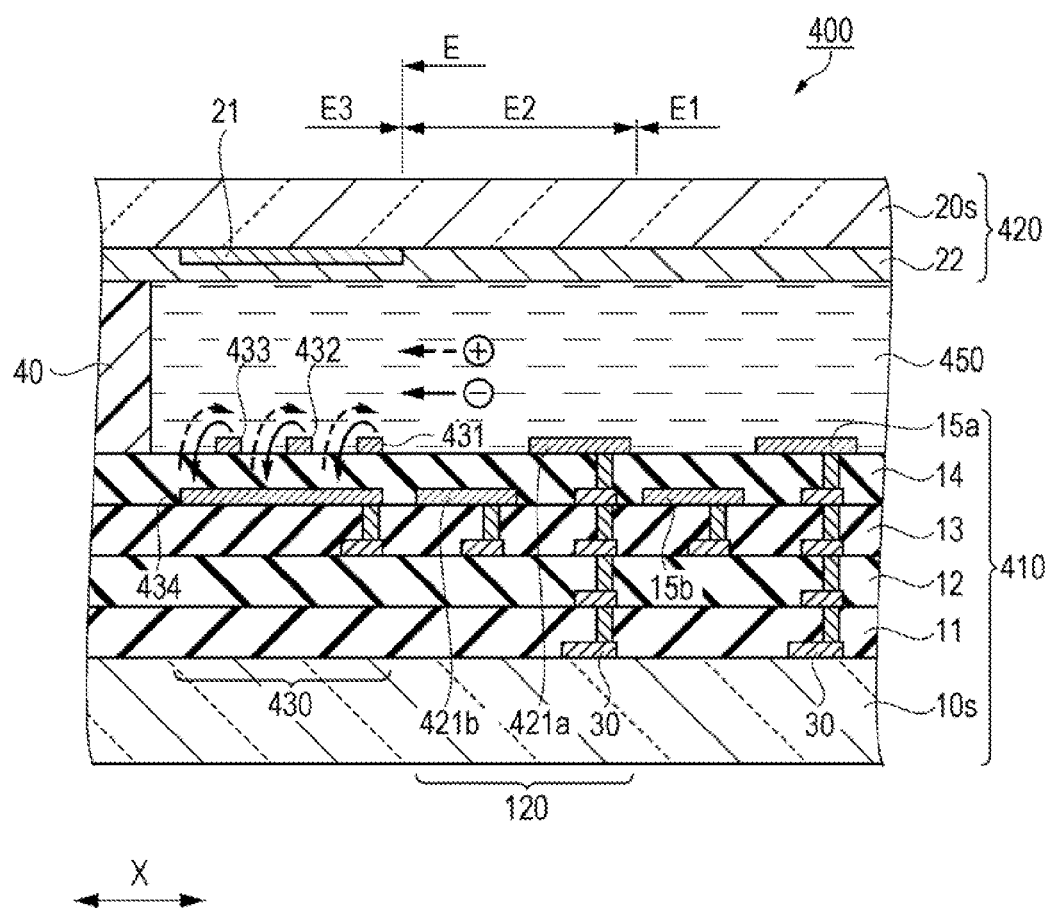
FIG. 16 is a cross-sectional view illustrating the overall structure of a liquid crystal device according to a first variation.

The locations where the ion trapping electrodes 131, 132, and 133 are disposed in the liquid crystal device 100 according to the aforementioned first embodiment are not limited to those described above. FIG. 16 is a cross-sectional view illustrating the overall structure of a liquid crystal device according to a first variation. Note that FIG. 16 corresponds to FIG. 6, which is referred to in the first embodiment. Constituent elements that are the same as those in the liquid crystal device 100 according to the first embodiment are given the same reference numerals, and detailed descriptions thereof will be omitted.

As shown in FIG. 16, a liquid crystal device 400 according to the first variation includes a liquid crystal layer 450 having positive dielectric anisotropy interposed between an element substrate 410 and an opposing substrate 420.

Pixels disposed in the active display region E1 of the element substrate 410 include first pixel electrodes 15a provided upon the third interlayer insulating film 14 and connected to the TFTs 30 and second pixel electrodes 15b provided in a layer below the first pixel electrodes 15a and to which the common potential (LCCOM) is supplied.

Dummy pixels disposed in the dummy pixel region E2 of the element substrate 410 include first dummy pixel electrodes 421a provided upon the third interlayer insulating film 14 and connected to the TFTs 30 and second dummy pixel electrodes 421b provided in a layer below the first dummy pixel electrodes 421a and to which the common potential (LCCOM) is supplied. The first dummy pixel electrodes 421a and the second dummy pixel electrodes 421b function as an electricity parting portion 120.

An ion trapping mechanism 430 disposed in the parting region E3 of the element substrate 410 includes a first electrode 431, a second electrode 432, and a third electrode 433 provided in the same layer as the first pixel electrodes 15a and the first dummy pixel electrodes 421a, and a fourth electrode 434 provided in a layer below the ion trapping electrodes 431, 432, and 433 so as to oppose the ion trapping electrodes 431, 432, and 433 and to which the common potential (LCCOM) is supplied.

Electrodes are not provided on the side of the opposing substrate 420 that faces the liquid crystal layer 450.

Although not shown in FIG. 16, the first pixel electrodes 15a, the first dummy pixel electrodes 421a, the ion trapping electrodes 431, 432, and 433, and the surface of the opposing substrate 420 that faces the liquid crystal layer 450 are covered by an organic orientation layer. Liquid crystal molecules having positive dielectric anisotropy are oriented approximately horizontally relative to the organic orientation layer.

The liquid crystal device 400 employs what is known as FFS (Fringe Field Switching), in which light incident on the pixels is modulated by using an approximately horizontal electrical field produced between the first pixel electrodes 15a and the second pixel electrodes 15b to change the orientation direction of the liquid crystal molecules in the liquid crystal layer 450.

AC signals having the same frequency but whose phases are shifted relative to each other are applied to the ion trapping electrodes 431, 432, and 433, respectively, so that an approximately horizontal electrical field produced between the ion trapping electrodes 431, 432, and 433 and the fourth electrode 434 is scrolled from the first electrode 431, which is closest to the first dummy pixel electrodes 421a, toward the third electrode 433. Positive-polarity (+) or negative-polarity (−) ionic impurities within the liquid crystal layer 450 in the display region E are pulled toward the ion trapping electrodes 431, 432, and 433, and are furthermore swept away to the parting region E3 by the stated electrical field scrolling.

Second Variation

Figure 17:
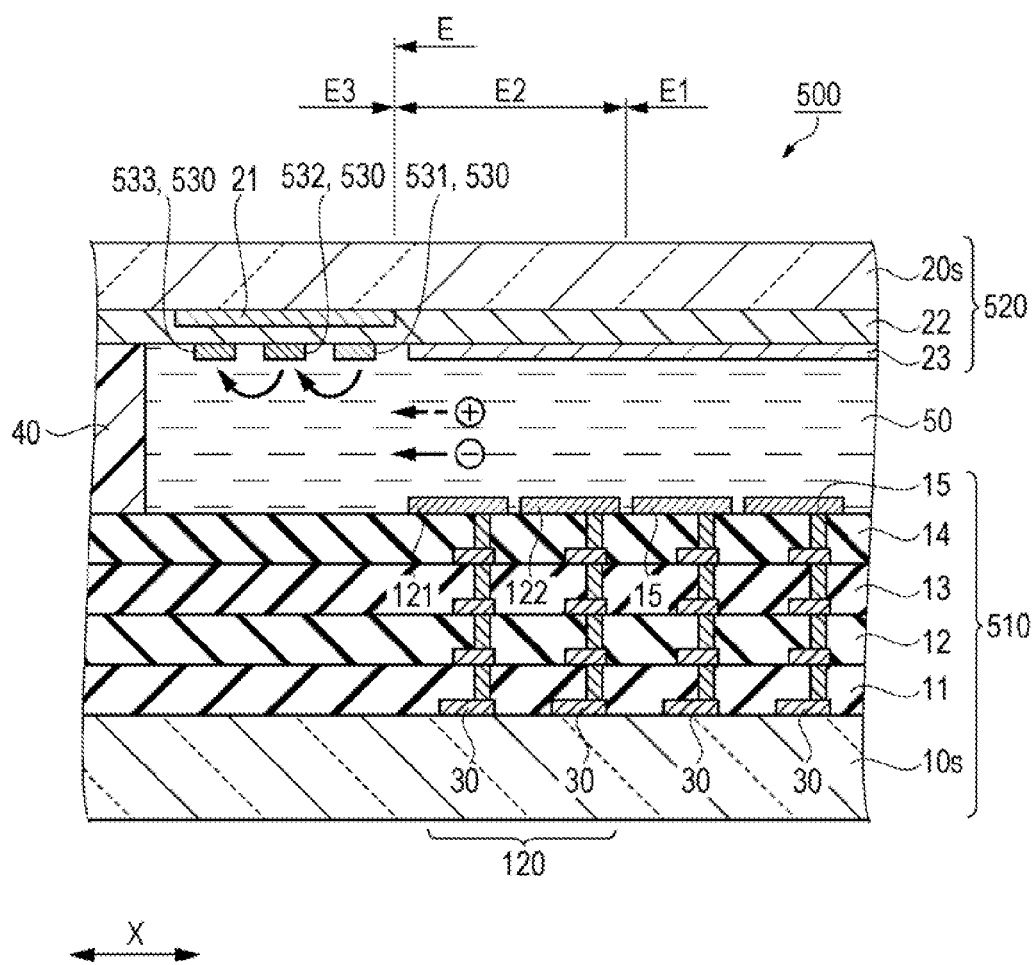
FIG. 17 is a cross-sectional view illustrating the overall structure of a liquid crystal device according to a second variation.

The locations where the ion trapping electrodes 131, 132, and 133 are disposed in the liquid crystal device 100 according to the aforementioned first embodiment are not limited to those described above. FIG. 17 is a cross-sectional view illustrating the overall structure of a liquid crystal device according to a second variation. Note that FIG. 17 corresponds to FIG. 6, which is referred to in the first embodiment. Constituent elements that are the same as those in the liquid crystal device 100 according to the first embodiment are given the same reference numerals, and detailed descriptions thereof will be omitted.

As shown in FIG. 17, in a liquid crystal device 500 according to the second variation, an ion trapping mechanism 530 is provided in the parting region E3, between the dummy pixel region E2 where the electricity parting portion 120 is disposed and the sealant 40. The ion trapping mechanism 530 includes a first electrode 531, a second electrode 532, and a third electrode 533 that are each provided in the same layer as the common electrode 23 of an opposing substrate 520.

AC signals having the same frequency but whose phases in an amount of time corresponding to a single cycle are shifted relative to each other are applied to the ion trapping electrodes 531, 532, and 533, respectively. Positive-polarity (+) or negative-polarity (−) ionic impurities within the liquid crystal layer 50 in the display region E are pulled toward the ion trapping electrodes 531, 532, and 533, and are furthermore swept away to the parting region E3 by electrical field scrolling produced between the ion trapping electrodes 531, 532, and 533.

Although not shown in FIG. 17, it should be noted that the pixel electrodes 15 and the dummy pixel electrodes 121 and 122 are covered by the orientation layer 18. The common electrode 23, the first electrode 531, the second electrode 532, and the third electrode 533 are covered by the orientation layer 24. The liquid crystal layer 50 has negative dielectric anisotropy.

The common electrode 23 and the ion trapping electrodes 531, 532, and 533 are each electrically connected to an external connection terminal provided in a terminal unit of an element substrate 510, through an upper limit conductive portion provided between the element substrate 510 and the opposing substrate 520.

Third Variation

In the liquid crystal device 100 according to the first embodiment, the ion trapping electrodes 131, 132, and 133 are not limited to being disposed so as to surround the display region E. In the case where areas where display problems will occur due to the localization of ionic impurities can be identified as shown in FIG. 4, the ion trapping electrodes 131, 132, and 133 may be disposed so as to correspond to the areas where such display problems will occur.

Fourth Variation

The liquid crystal devices in which the ion trapping mechanisms 130, 330, and 430 according to the aforementioned embodiments can be applied are not limited to VA types or FFS types, and can also be applied in IPS (In Plane Switching), OCB (Optically Compensated Birefringence), and other such types as well.

Fifth Variation

The electronic device in which the liquid crystal device 100 according to the first embodiment or the liquid crystal device 200 according to the second embodiment can be applied is not limited to the projection-type display apparatus 1000 according to the fourth embodiment. Likewise, the electronic device in which the liquid crystal device 300 according to the third embodiment can be applied is not limited to the projection-type display apparatus 2000 according to the fifth embodiment. The liquid crystal devices can be used favorably as the display units of projection-type HUDs (heads-up displays) and direct-view HMDs (head-mounted displays), information terminal devices such as electronic books, personal computers, digital still cameras, liquid crystal televisions, viewfinder-based or direct-view monitor-based video recorders, car navigation systems, electronic organizers, POSs, and so on.

What is claimed is:

1. A liquid crystal device, comprising:
   a first substrate including a display region in which a plurality of pixel electrodes are aligned in matrix;
   a second substrate including a common electrode;
   a sealant disposed between the first substrate and the second substrate so as to surround the display region;
   a liquid crystal layer interposed between the first substrate, the second substrate and the sealant;
   a first electrode disposed between the display region and the sealant;
   a second electrode disposed between the first electrode and the sealant; and
   a third electrode disposed between the second electrode and the sealant,
   wherein
   the first electrode is supplied a first signal,
   the second electrode is supplied a second signal,
   the third electrode is supplied a third signal,
   the pixel electrodes are supplied an image signal,
   a frequency of each of the first signal, the second signal, and the third signal is lower than a frequency of the image signal, and
   the second signal has a phase retardation with respect to the first signal, and the third signal has a phase retardation with respect to the first signal and the second signal, such that an electrical field generated between the first electrode, the second electrode, and the third electrode moves from the first electrode toward the third electrode in a direction away from the display region.

2. A liquid crystal device according to claim 1, wherein the first signal, the second signal, and the third signal have a same frequency.

3. A liquid crystal device according to claim 1, wherein the first signal, the second signal, and the third signal are an AC signal.

4. A liquid crystal device according to claim 1, wherein the second electrode is in a same layer as the pixel electrodes.

5. A liquid crystal device according to claim 1, wherein the first electrode is in a same layer as the pixel electrodes.

6. A liquid crystal device according to claim 1, wherein the first signal, the second signal, and the third signal have a same waveform.

7. A liquid crystal device according to claim 1, wherein the common electrode is opposed to the pixel electrodes, the first electrode, the second electrode, and the third electrode.

8. A liquid crystal device according to claim 1, wherein the third electrode is in a same layer as the pixel electrodes.

9. An electronic device comprising the liquid crystal device according to claim 1.

* * * * *